US010886557B2

(12) United States Patent
Sato et al.

(10) Patent No.: US 10,886,557 B2
(45) Date of Patent: Jan. 5, 2021

(54) FUEL CELL STACK

(71) Applicant: HONDA MOTOR CO., LTD., Tokyo (JP)

(72) Inventors: Masahiko Sato, Wako (JP); Takanori Mori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 230 days.

(21) Appl. No.: 15/723,780

(22) Filed: Oct. 3, 2017

(65) Prior Publication Data

US 2018/0102564 A1  Apr. 12, 2018

(30) Foreign Application Priority Data

Oct. 6, 2016 (JP) ................................. 2016-197976
Oct. 6, 2016 (JP) ................................. 2016-197982
Oct. 13, 2016 (JP) ................................. 2016-201986
Oct. 13, 2016 (JP) ................................. 2016-201998
Dec. 19, 2016 (JP) ................................. 2016-245506

(51) Int. Cl.
*H01M 8/24* (2016.01)
*H01M 8/2475* (2016.01)
*H01M 8/2465* (2016.01)
*H01M 8/0273* (2016.01)
*H01M 8/1004* (2016.01)

(52) U.S. Cl.
CPC ....... *H01M 8/2459* (2016.02); *H01M 8/0273* (2013.01); *H01M 8/1004* (2013.01); *H01M 8/2465* (2013.01); *H01M 8/2475* (2013.01)

(58) Field of Classification Search
CPC ............. H01M 8/0273; H01M 8/1004; H01M 8/2459; H01M 8/2465; H01M 8/2475
See application file for complete search history.

(56) References Cited

U.S. PATENT DOCUMENTS

| 8,791,376 B2 | 7/2014 | Endt et al. |
| 2010/0119907 A1* | 5/2010 | Shibata ............... H01M 8/0247 429/432 |
| 2015/0000974 A1 | 1/2015 | Shiga et al. |

FOREIGN PATENT DOCUMENTS

| DE | 10 2011 110 380 B3 | 7/2012 |
| DE | 10 2013 113 013 A1 | 1/2015 |
| JP | S59-155783 U | 10/1984 |
| JP | H05-050276 U | 7/1993 |
| JP | H08-335419 A | 12/1996 |
| JP | 2000-223141 A | 8/2000 |
| JP | 2010-214992 A | 9/2010 |
| JP | 2013-173407 A | 9/2013 |

OTHER PUBLICATIONS

Search report dated Jul. 9, 2018 issued over the corresponding German Patent Application No. 102017217825.6 with the English translation thereof.
Office Action dated Sep. 24, 2019 issued over the corresponding Japanese Patent Application No. 2016-245506 with the English translation thereof.

* cited by examiner

*Primary Examiner* — Adam A Arciero
(74) *Attorney, Agent, or Firm* — Carrier Blackman & Associates, P.C.; Joseph P. Carrier; Jeffrey T. Gedeon

(57) ABSTRACT

An opening is formed in an accommodating case of a fuel cell stack. Flat cables are led out of the accommodating case through the opening. The flat cables pass through a grommet covering the opening. The grommet is positioned by a seal plate (positioning member) attached to the accommodating case.

7 Claims, 18 Drawing Sheets

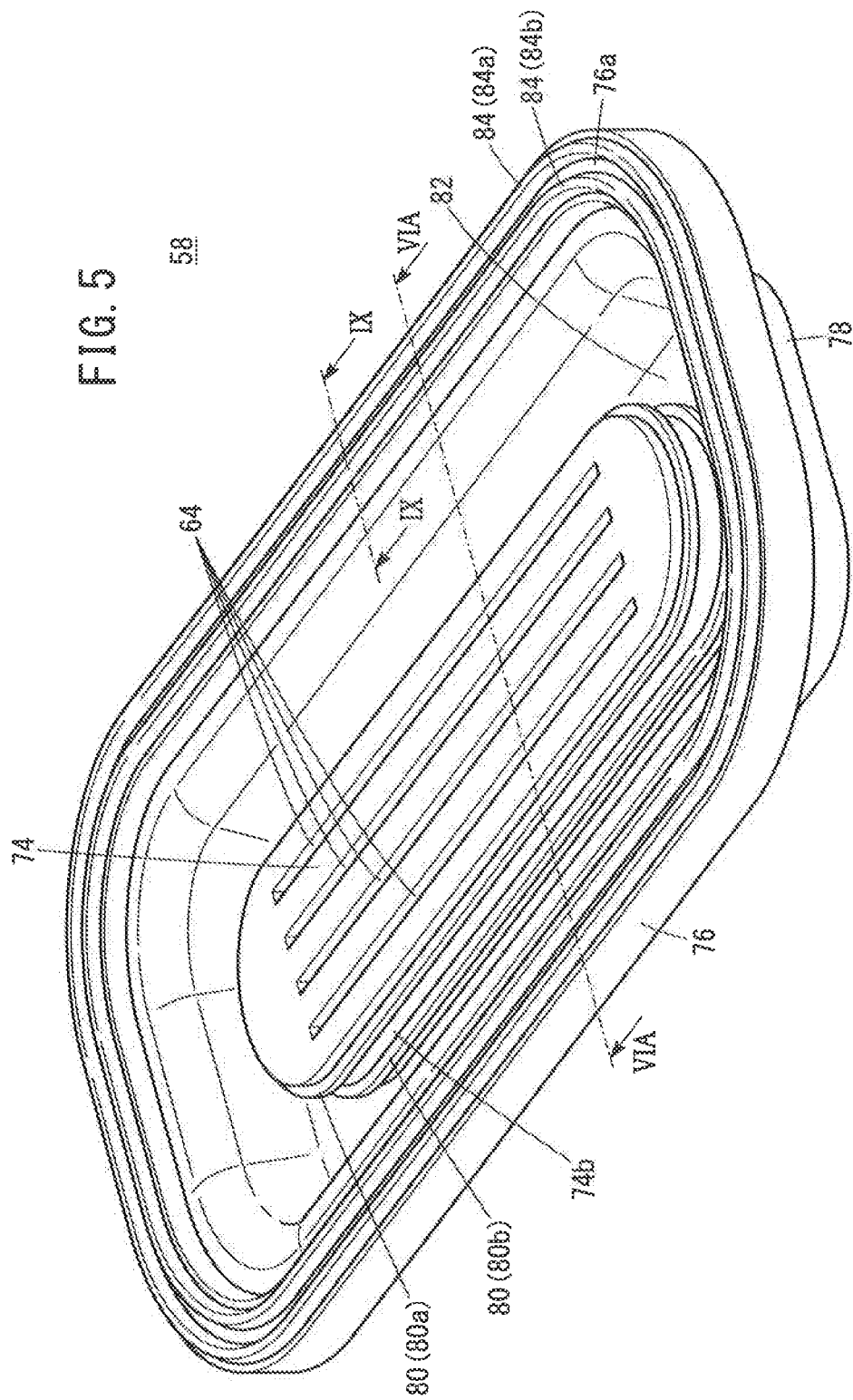

FUEL CELL STACK

CROSS-REFERENCE TO RELATED APPLICATIONS

This application is based upon and claims the benefit of priority from Japanese Patent Applications No. 2016-197976 filed on Oct. 6, 2016, No. 2016-197982 filed on Oct. 6, 2016, No. 2016-201986 filed on Oct. 13, 2016, No. 2016-201998 filed on Oct. 13, 2016, and No. 2016-245506 filed on Dec. 19, 2016, the contents all of which are incorporated herein by reference.

BACKGROUND OF THE INVENTION

Field of the Invention

The present invention relates to a fuel cell stack including a cable passing through an opening of an accommodating case.

Description of the Related Art

For example, a solid polymer electrolyte fuel cell includes a power generation cell (unit fuel cell). An anode is provided on one surface of an electrolyte membrane, and a cathode is provided on the other surface of the electrolyte membrane to form a membrane electrode assembly (MEA). The electrolyte membrane is a polymer ion exchange membrane. The membrane electrode assembly is sandwiched between separators to form the power generation cell.

In the fuel cell of this type, in use, in order to obtain a desired electrical energy in power generation, a predetermined number of (e.g., several tens to several hundreds of) power generation cells are stacked together to form a fuel cell stack. In this type of the fuel cell stack, it is necessary to detect whether or not each of the power generation cells has the desired power generation performance. For this purpose, generally, a cell voltage detection terminal provided on the separator is connected to a voltage detection device (cell voltage monitor) to detect the cell voltage of each of the power generation cells during power generation (e.g., see Japanese Laid-Open Patent Publication No. 2000-223141).

SUMMARY OF THE INVENTION

According to safety regulations of the fuel cell stack, it is required to provide a gas barrier structure for preventing leakage of hydrogen to the outside of the fuel cell stack. For compliance with such regulations, in the fuel cell stack, the gas barrier structure is realized by accommodating a cell stack body formed by stacking a plurality of power generation cells in an accommodating case.

Further, in order to connect the cell voltage detection terminal provided on the separator, to the voltage detection device, while maintaining the gas barrier structure using the accommodating case, it may be considered to provide a grommet at an opening of the accommodating case, insert cables through a hole formed in the grommet, and then seal the hole. In this case, the cables need to be led out of the accommodating case through the grommet provided at the opening of the accommodating case, while achieving a desired seal performance for the accommodating case.

However, at the time of assembling the grommet to the accommodating case, depending on the assembling method, part of the grommet may be dropped into the opening, and the grommet may be assembled obliquely. In such a case, there is a risk that the desired sealing performance may not be achieved. It may be considered to provide a step for positioning the grommet in the accommodating case. However, if the grommet rides on the step and is assembled obliquely, there is also a risk that the desired sealing performance may not be obtained.

For example, in some cases, the fuel cell stack is made up of several hundreds of power generation cells. In a technique of inserting several hundreds of cables one by one through respective grommet holes and sealing the grommet holes individually, since the size of the grommet become large as a whole, it is not possible to provide the space sufficient for the grommet having the large size. In an attempt to address the problem, it may be considered to use flat cables (flat harness) each having a plurality of lead wires (unit wires) that are arranged in parallel, to thereby gather the cables into one location for size reduction. In this case, it is desired that the flat cables are led out of the accommodating case through the grommet provided at the opening of the accommodating case, while maintaining the desired sealing performance of the accommodating case.

An object of the present invention is to solve at least one of the above described problems.

That is, an object of the present invention is to provide a fuel cell stack which makes it possible to easily achieve a desired sealing performance with respect to a location where a cable passes through an accommodating case.

Further, another object of the present invention is to provide a fuel cell stack which makes it possible to reduce the size of a grommet by using a flat cable, and realize a seal structure without any gas leakage from an accommodating case.

In order to achieve the above object, according to an aspect of the present invention, a fuel cell stack including a cell stack body, and an accommodating case configured to accommodate the cell stack body is provided. The cell stack body includes a plurality of power generation cells stacked. Each of the power generation cells is formed by stacking a membrane electrode assembly and a separator. The membrane electrode assembly includes a pair of electrodes and an electrolyte membrane interposed between the electrodes. A cable connected to the cell stack body in the accommodating case passes through an opening formed in the accommodating case, and the cable is led out of the accommodating case. The cable passes through a grommet covering the opening, and the grommet is positioned with respect to the opening by a positioning member attached to the accommodating case.

In the fuel cell stack of the present invention, the grommet is positioned with respect to the accommodating case by the positioning member attached to the accommodating case. In the structure, since the grommet is positioned by the positioning member, positional displacement of the grommet relative to the opening is suppressed greatly. Therefore, the grommet is not damaged by friction against the accommodating case, and it is possible to prevent the grommet from being dropped into the opening (in the case where a step is provided on the accommodating case, it is also possible to prevent the grommet from riding on the step). Therefore, it is possible to achieve a desired sealing performance easily. Further, at the time of assembling, since it is possible to easily position the grommet with respect to the opening, shortening of time required for assembling operation can be expected as well.

Further, according to another aspect of the present invention, a fuel cell stack including a cell stack body, and an accommodating case configured to accommodate the cell stack body is provided. The cell stack body includes a plurality of power generation cells stacked. Each of the power generation cells is formed by stacking a membrane electrode assembly and a separator. The membrane electrode assembly includes a pair of electrodes and an electrolyte membrane interposed between the electrodes. A cell voltage detection terminal is provided on the separator, a flat cable is connected to the cell voltage detection terminal, the flat cable passes through an opening formed in the accommodating case, and the flat cable is led out of the accommodating case. A grommet having a slit is provided at the opening, and the slit passes through the grommet in the thickness direction. The flat cable is inserted through the slit, and sealed hermetically by a potting portion provided adjacent to the grommet. The grommet includes a cable insertion portion having the slit, and a flange annularly arranged around the cable insertion portion and facing the accommodating case. A plurality of seals are annularly arranged in lines along the flange, between the flange and the accommodating case.

In the fuel cell stack, the outer peripheral portion of the flat cable passing through the opening of the accommodating case is sealed hermetically by the potting portion. Therefore, it is possible to reduce the size of a grommet used for adopting the flat cable, and realize a seal structure without any gas leakage from the accommodating case. Since the seals in the plurality of lines are provided between the flange of the grommet and the accommodating case, it is possible to suppress improper assembling due to inclination of the seal, and achieve the desired sealing performance.

Further, according to still another aspect of the present invention, a fuel cell stack including a cell stack body, and an accommodating case configured to accommodate the cell stack body is provided. The cell stack body includes a plurality of power generation cells stacked. Each of the power generation cells is formed by stacking a membrane electrode assembly and a separator. The membrane electrode assembly includes a pair of electrodes and an electrolyte membrane interposed between the electrodes. A cell voltage detection terminal is provided on the separator, a flat cable is connected to the cell voltage detection terminal, the flat cable passes through an opening formed in the accommodating case, and the flat cable is led out of the accommodating case. A grommet having a slit is provided at the opening, and the slit passes through the grommet in the thickness direction. The flat cable is inserted through the slit, and sealed hermetically by a potting portion provided adjacent to the grommet. The grommet includes a cable insertion portion having the slit, and a plurality of ridge-shaped seals which are annularly arranged in lines around the outside of the cable insertion portion and arranged side-by-side in a direction in which the opening passes through the accommodating case.

In the fuel cell stack, since the grommet includes the plurality of seals arranged in the plurality of lines and arranged side-by-side in the direction in which the opening passes through the accommodating case, it is possible to suppress improper assembling due to inclination of the seals, and achieve the desired sealing performance.

Further, according to still another aspect of the present invention, a fuel cell stack of including a cell stack body, and an accommodating case configured to accommodate the cell stack body is provided. The cell stack body includes a plurality of power generation cells stacked. Each of the power generation cells is formed by stacking a membrane electrode assembly and a separator. The membrane electrode assembly includes a pair of electrodes and an electrolyte membrane interposed between the electrodes. A cell voltage detection terminal is provided on the separator, a flat cable is connected to the cell voltage detection terminal, the flat cable passes through an opening formed in the accommodating case, and the flat cable is led out of the accommodating case. A grommet having a slit is provided at the opening, and the slit passes through the grommet in the thickness direction. The flat cable is inserted through the slit, and sealed hermetically by a potting portion provided adjacent to the grommet. The potting portion includes a first potting layer adjacent to the grommet and a second potting layer adjacent to the first potting layer on an opposite side from the grommet.

In the fuel cell stack of the present invention, the outer peripheral portion of the flat cable passing through the opening of the accommodating case is sealed by the potting portion including the first potting layer and the second potting layer. Therefore, it is possible to reduce the size of the grommet used for adopting a flat cable, and realize a seal structure without any gas leakage from the accommodating case.

Further, according to still another aspect of the present invention, a fuel cell stack including a cell stack body, and an accommodating case configured to accommodate the cell stack body is provided. The cell stack body includes a plurality of power generation cells stacked. Each of the power generation cells is formed by stacking a membrane electrode assembly and a separator. The membrane electrode assembly includes a pair of electrodes and an electrolyte membrane interposed between the electrodes. A cell voltage detection terminal is provided on the separator, a flat cable is connected to the cell voltage detection terminal, the flat cable passes through an opening formed in the accommodating case, and the flat cable is led out of the accommodating case. A grommet made of EPDM is provided at the opening, the grommet having a slit passing through the grommet in the thickness direction. The flat cable is inserted through the slit, and sealed hermetically by a potting portion made of silicone, the potting portion being provided adjacent to the grommet through an intermediate layer. The intermediate layer is provided between the grommet and the potting portion, and made of a material which does not inhibit hardening of a silicone potting material in the liquid state.

When the silicone potting material in the liquid state contacts EPDM, the silicone potting material is not easily hardened. In the fuel cell stack, the intermediate layer which does not inhibit hardening of a liquid silicone potting material is provided between the grommet made of EPDM and the potting portion. Accordingly, it is possible to harden the silicone potting material in the liquid state reliably.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a perspective view showing a grommet of the seal structure;

DESCRIPTION OF THE PREFERRED EMBODIMENTS

Hereinafter, preferred embodiments of a fuel cell stack according to the present invention will be described with reference to the accompanying drawings.

Figure 1:
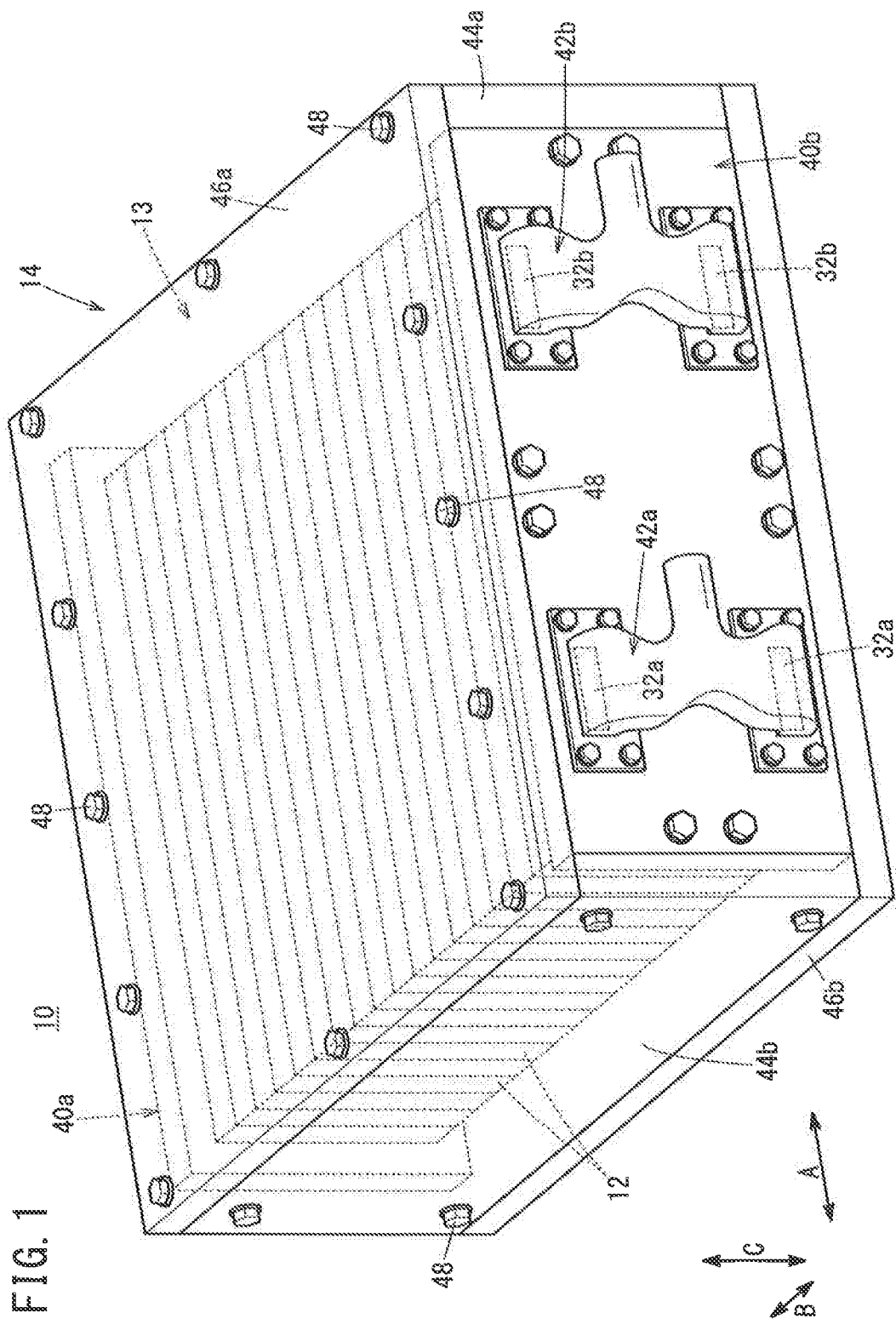
FIG. 1 is a perspective view showing a fuel cell stack according to a first embodiment of the present invention.

A fuel cell stack 10 according to a first embodiment of the present invention shown in FIG. 1 is mounted, e.g., in a fuel cell electric vehicle (not shown). The fuel cell stack 10 includes a cell stack body 13 formed by stacking a plurality of power generation cells 12 (unit fuel cells) and an accommodating case 14 accommodating the cell stack body 13. In FIG. 1, a plurality of power generation cells 12 are stacked together in a horizontal direction indicated by an arrow B such that electrode surfaces of the power generation cells 12 are oriented upright. It should be noted that the plurality of power generation cells 12 may be stacked together in the gravity direction indicated by an arrow C.

Figure 2:
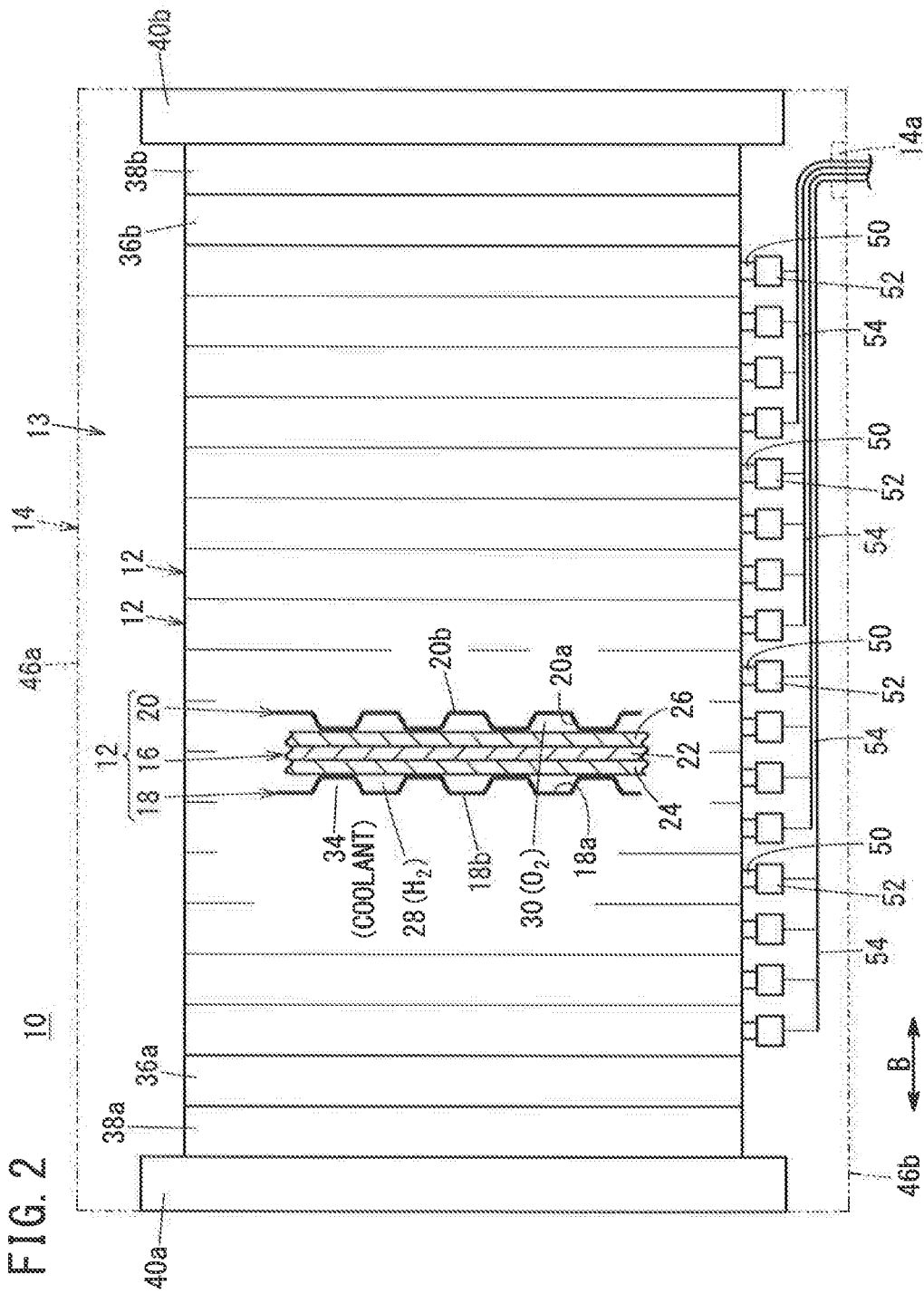
FIG. 2 is a view schematically showing the fuel cell stack.

As shown in FIG. 2, each of the power generation cells 12 includes a membrane electrode assembly 16, and a first separator 18 and a second separator 20 sandwiching the membrane electrode assembly 16. For example, the first separator 18 and the second separator 20 are metal plates such as steel plates, stainless steel plates, aluminum plates, plated steel sheets, or metal plates having anti-corrosive surfaces by surface treatment.

Each of the first separator 18 and the second separator 20 has a rectangular surface, and is formed by corrugating a metal thin plate by press forming to have a corrugated shape in cross section and a wavy shape on the surface. Instead of the metal separators, for example, carbon separators may be used as the first separator 18 and the second separator 20.

The membrane electrode assembly 16 includes an anode 24 and a cathode 26, and a solid polymer electrolyte membrane 22 interposed between the anode 24 and the cathode 26. The solid polymer electrolyte membrane 22 is formed by impregnating a hydrocarbon based thin film or a thin membrane of perfluorosulfonic acid with water, for example.

Though not shown in detail, each of the anode 24 and the cathode 26 has a gas diffusion layer such as a carbon paper, and an electrode catalyst layer of platinum alloy supported on porous carbon particles. The carbon particles are deposited uniformly on the surface of the gas diffusion layer. For example, the electrode catalyst layer of the anode 24 and the electrode catalyst layer of the cathode 26 are formed on both surfaces of the solid polymer electrolyte membrane 22, respectively.

The cell stack body 13 has an oxygen-containing gas supply passage (not shown) for supplying an oxygen-containing gas and an oxygen-containing gas discharge passage (not shown) for discharging the oxygen-containing gas. The oxygen-containing gas supply passage and the oxygen-containing gas discharge passage extend through the plurality of power generation cells 12 in the stacking direction indicated by the arrow B.

Further, the cell stack body 13 has a fuel gas supply passage (not shown) for supplying a fuel gas such as a hydrogen-containing gas and a fuel gas discharge passage (not shown) for discharging the fuel gas. The fuel gas supply passage and the fuel gas discharge passage extend through the plurality of power generation cells 12 in the stacking direction indicated by the arrow B.

Further, the cell stack body 13 has coolant supply passages 32a for supplying a coolant and coolant discharge passages 32b for discharging the coolant (see FIG. 1). The coolant supply passages 32a and the coolant discharge passages 32b extend through the plurality of power generation cells 12 in the stacking direction indicated by the arrow B.

In FIG. 2, the first separator 18 has a fuel gas flow field 28 on its surface 18a facing the membrane electrode assembly 16. The fuel gas flow field 28 extends, for example, in the direction indicated by the arrow A. The fuel gas flow field 28 is connected to the fuel gas supply passage and the fuel gas discharge passage described above.

On the other hand, the second separator 20 has an oxygen-containing gas flow field 30 on its surface 20a facing the membrane electrode assembly 16. The oxygen-containing gas flow field 30 extends, for example, in the direction indicated by the arrow A. The oxygen-containing gas flow field 30 is connected to the oxygen-containing gas supply passage and the oxygen-containing gas discharge passage described above.

A coolant flow field 34 is formed between a surface 18b of the first separator 18 of one of the adjacent power generation cells 12 and a surface 20b of the second separator 20 of the other of the adjacent power generation cells 12. The coolant flow field 34 is connected to the coolant supply passages 32a and the coolant discharge passages 32b (see FIG. 1). The coolant flow field 34 is formed by stacking the back surface of the fuel gas flow field 28 and the back surface of the oxygen-containing gas flow field 30.

The embodiment of the present invention adopts a cooling structure where cells each formed by sandwiching one MEA 16 between two separators are stacked together, and the coolant flows between the adjacent cells. It should be noted that so called skip cooling structure where coolant flows at intervals of every predetermined number of cells may be adopted. In this case, each of the cells includes three or more separators and two or more MEAs.

At one end of the power generation cells 12 in the stacking direction, a first terminal plate 36a is provided. A first insulating plate 38a is provided outside the first terminal plate 36a. A first end plate 40a is provided outside the first insulating plate 38a. At the other end of the power generation cells 12 in the stacking direction, a second terminal plate 36b is provided. A second insulating plate 38b is provided outside the second terminal plate 36b, and a second end plate 40b is provided outside the second insulating plate 38b.

Though not shown, an oxygen-containing gas supply manifold member, an oxygen-containing gas discharge manifold member, a fuel gas supply manifold member, and a fuel gas discharge manifold member are attached to the first end plate 40a. The oxygen-containing gas supply manifold member is connected to the oxygen-containing gas supply passage. The oxygen-containing gas discharge manifold member is connected to the oxygen-containing gas discharge passage. The fuel gas supply manifold member is connected to the fuel gas supply passage. The fuel gas discharge manifold member is connected to the fuel gas discharge passage.

As shown in FIG. 1, a coolant supply manifold member 42a and a coolant discharge manifold member 42b are attached to the second end plate 40b. The coolant supply manifold member 42a is connected to a pair of coolant supply passages 32a. The coolant discharge manifold member 42b is connected to a pair of coolant discharge passages 32b.

Two sides (surfaces) of the accommodating case 14 at both ends in the vehicle width direction indicated by the arrow B are the first end plate 40a and the second end plate 40b. Two sides (surfaces) of the accommodating case 14 at both ends in the vehicle length direction indicated by the arrow A are a front side panel 44a and a rear side panel 44b each having a laterally elongated plate shape. Two sides (surfaces) of the accommodating case 14 at both ends in the vehicle height direction indicated by the arrow C are an upper side panel 46a and a lower side panel 46b. The upper side panel 46a and the lower side panel 46b each have a laterally elongated plate shape.

The front side panel 44a and the rear side panel 44b are fixed to the first end plate 40a and the second end plate 40b using screws 48 in an air tight manner and a liquid tight manner. Further, the upper side panel 46a and the lower side panel 46b are fixed to the first end plate 40a, the second end plate 40b, the front side panel 44a, and the rear side panel 44b using screws 48 in an air tight manner and a liquid tight manner. In this manner, the accommodating case 14 is formed by assembling the first end plate 40a, the second end plate 40b, the front side panel 44a, the rear side panel 44b, the upper side panel 46a, and the lower side panel 46b together.

The above described accommodating case 14 functions as a gas isolation structure (gas barrier) for preventing leakage of reactant gases such as a hydrogen gas to the outside of the accommodating case 14.

As shown in FIG. 2, a cell voltage detection terminal 50 is provided on each of the power generation cells 12. The cell voltage detection terminal 50 protrudes downward from a lower side of the above described first separator 18 (or the second separator 20). The cell voltage detection terminal 50 may be provided at any position of the above described first separator 18 (or the second separator 20). In the case where the skip cooling structure having the three separators is adopted, the cell voltage detection terminal 50 is provided, for example, on a separator at an intermediate position.

A flat cable (flat harness) 54 is connected to the cell voltage detection terminal 50 through a connector 52. The structure of the cell voltage detection terminal 50 is not limited specially as along as the cell voltage detection terminal 50 can be electrically connected to the flat cable 54. In the fuel cell stack 10 according to the embodiment of the present invention, a plurality of flat cables 54 are provided. The connector 52 is fixed to the inner surface (specifically, inner surface of the lower side panel 46b) of the accommodating case 14. The flat cable 54 is a band-shaped cable formed by combining a plurality of lead wires arranged in parallel together, and having substantially flat surfaces on both sides in the thickness direction.

Figure 3:
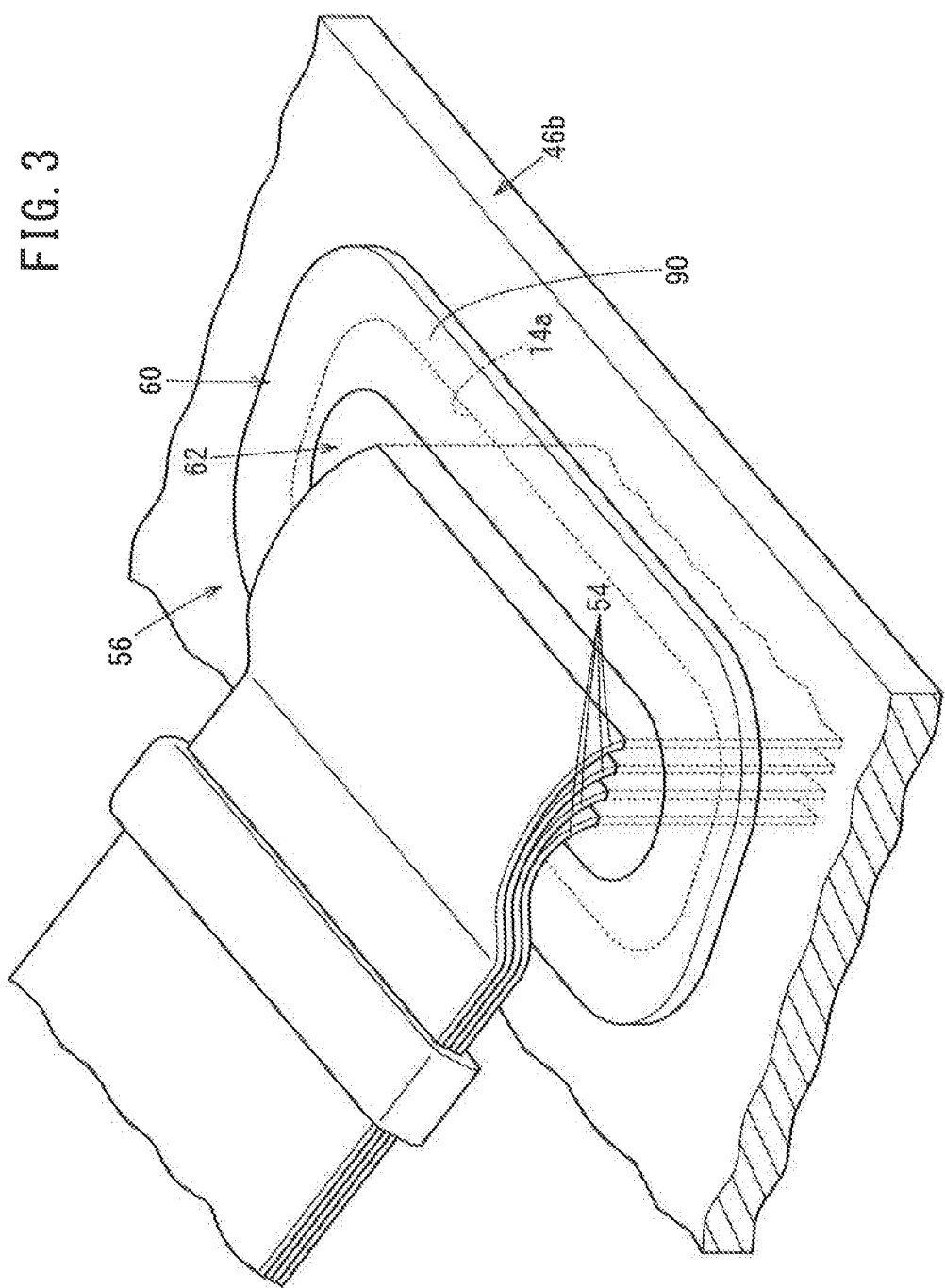
FIG. 3 is a perspective view showing a seal structure of flat cables.

The plurality of flat cables 54 are stacked together in the thickness direction, inside the accommodating case 14. As shown in FIGS. 2 and 3, the plurality of flat cables 54 extend to the outside of the accommodating case 14 through an opening 14a formed in the accommodating case 14 (specifically, the lower side panel 46b). The opening 14a has a non-circular shape. In FIG. 3, the opening 14a has a substantially rectangular shape rounded at each corner. The opening 14a may have a different non-circular shape (e.g., elliptical shape, etc.). The plurality of flat cables 54 are connected to a cell voltage detection device (not shown), outside the accommodating case 14. For example, the cell voltage detection device is fixed to an outer surface 46b1 of the accommodating case 14. The cell voltage detection device detects the cell voltage (electromotive force) of each of the power generation cells 12 during power generation.

Figure 4:
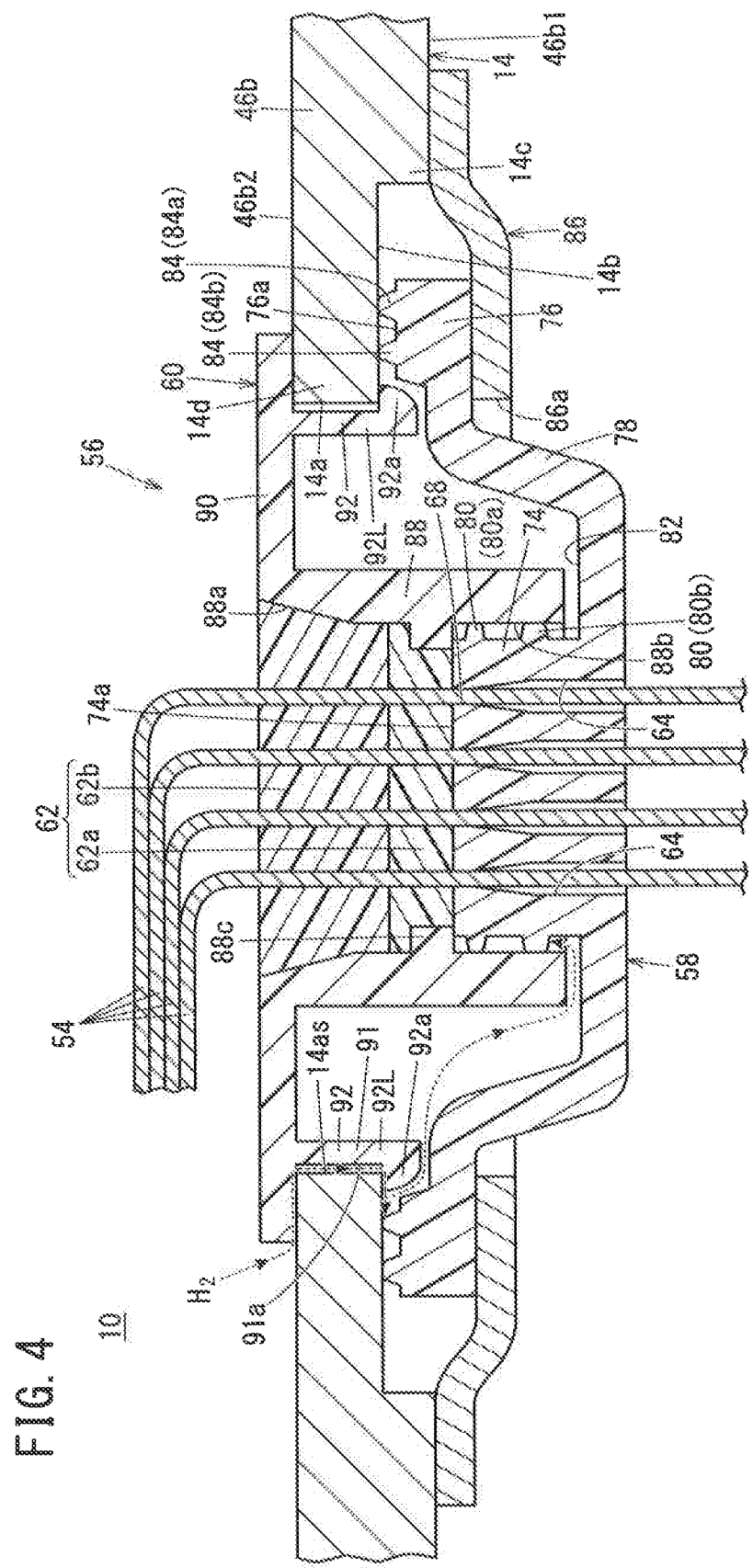
FIG. 4 is a cross sectional view showing the seal structure.

As shown in FIGS. 3 and 4, a seal structure 56 is provided at the opening 14a of the accommodating case 14 (lower side panel 46b). The seal structure 56 seals the outer peripheral portions of the plurality of flat cables 54 by a potting portion 62. As shown in FIG. 4, the seal structure 56 includes a grommet 58 which covers the opening 14a, a seal plate 60 (positioning member) provided at the opening 14a, and the potting portion 62 provided at the seal plate 60.

The grommet 58 is provided on an outer surface 46b1 (lower surface) of the lower side panel 46b in a manner to cover the opening 14a. The grommet 58 tightly contacts the lower side panel 46b at a seal portion thereof (second seal ridges 84) in an air tight manner and liquid tight manner. A grommet placement recess 14b is provided on the outer surface 46b1 of the lower side panel 46b through a step 14c, around the opening 14a. The grommet placement recess 14b is recessed toward an inner surface 46b2 of the lower side panel 46b. The grommet 58 is placed in the grommet placement recess 14b. A plurality of slits 64 are formed in the grommet 58. The slits 64 pass through the grommet 58 in the thickness direction of the grommet 58.

As shown in FIG. 5, the plurality of slits 64 are spaced from one another in a direction perpendicular to the thickness direction of the grommet 58. The grommet 58 has a shape elongated in one direction perpendicular to the thickness direction. The plurality of slits 64 extend in parallel to each other in the longitudinal direction of the grommet 58.

Figure 6A:
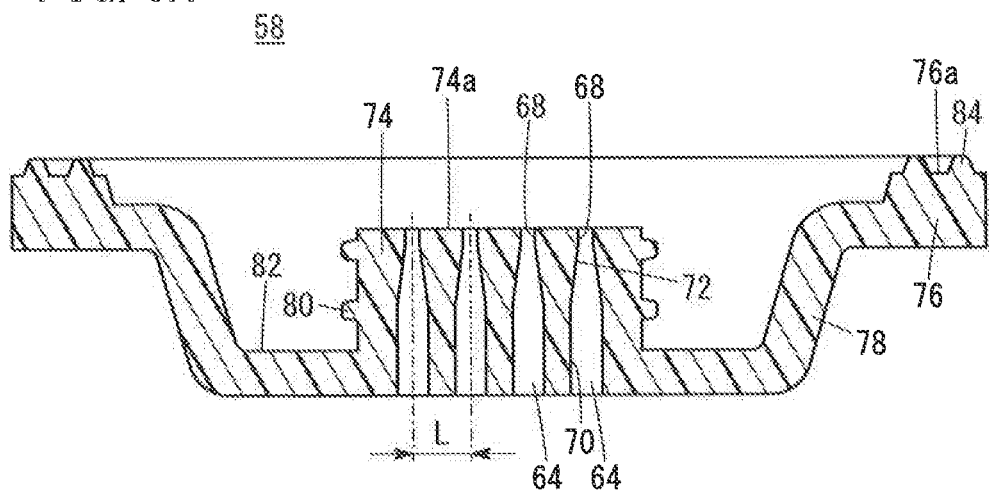
FIG. 6A is a cross sectional view showing the grommet taken along a line VIA-VIA in FIG. 5.

In FIG. 6A, preferably, the interval L between the plurality of slits 64 (interval between the centers of the adjacent slits 64 in the slit width direction) is, e.g., in a range of 1 to 5 mm, depending on the viscosity of the potting material (resin material) used for forming the potting portion 62.

A narrow part 68 is provided at one end of the slit 64 in a direction (one end closer to the opening 14a) in which the slit 64 passes through the grommet 58. The narrow part 68 forms a constricted portion which is thinner than the other part of the slit 64. In FIG. 4, the narrow part 68 contacts both surfaces of the flat cable 54.

As shown in FIG. 6A, a wide part 70 is provided at the other end of the slit 64 in the direction in which the slit 64 passes through the grommet 58. The slit width of the wide part 70 is larger than the slit width of the narrow part 68. A taper part 72 is provided between the narrow part 68 and the wide part 70. The slit width of the taper part 72 is increased toward the wide part 70. Part of the slit 64 other than the narrow part 68 (taper part 72 and wide part 70) does not necessarily have to contact both surfaces of the flat cable 54. For example, in the case where the wide part 70 does not contact both surfaces of the flat cable 54 (in the case where the slit width of the wide part 70 is larger than the thickness of the flat cable 54), the wide part 70 allows the flat cable 54 to move in the slit width direction. Further, in this case, the grommet 58 can be formed easily.

Figure 6B:
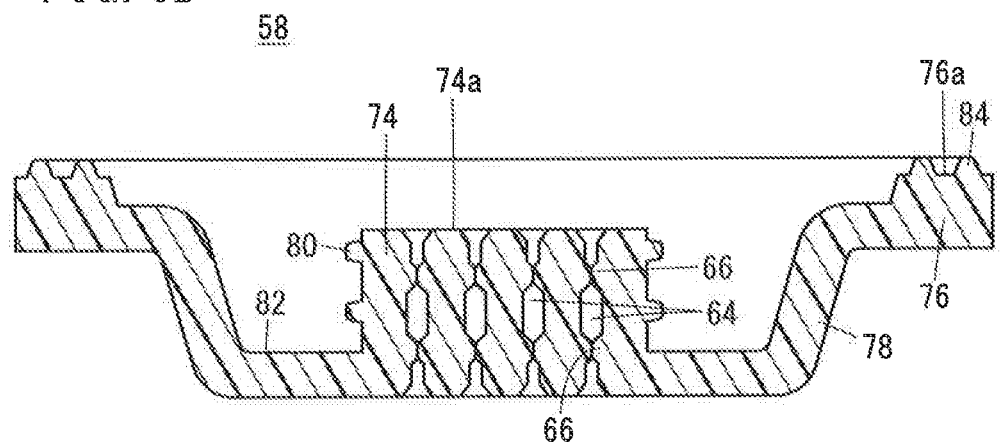
FIG. 6B is a cross sectional view showing the grommet according to a modified embodiment.

A lip part 66 may be provided in each slit 64 as in the case of a grommet 58 according to a modified embodiment shown in FIG. 6B. The two lip parts 66 are provided on respective mutually-facing slit surfaces, which are the inner surfaces of the slit 64, so as to protrude toward each other. For example, two pairs of lip parts 66 are provided at an interval in the thickness direction of the grommet 58 (in the direction in which the slit 64 passes through the grommet 58).

The lip parts 66 form constricted portions which are narrower than the other part of the slit 64. In the case where the flat cable 54 is inserted into the slit 64 having the lip parts 66, the lip parts 66 contact both surfaces of the flat cable 54. In this case, part of the slit 64 other than the lip parts 66 need not contact both surfaces of the flat cable 54.

As shown in FIGS. 4 and 5, the grommet 58 includes a mating protrusion 74 (cable insertion portion) which protrudes toward the opening 14a (seal plate 60), a flange 76 provided outside the mating protrusion 74 and annularly arranged around the mating protrusion 74, and an intermediate portion 78 between the mating protrusion 74 and the flange 76. A plurality of slits 64 described above are formed in the mating protrusion 74.

As shown in FIG. 5, the mating protrusion 74 extends in the longitudinal direction of the grommet 58, and first seal ridges 80 protruding outward are provided on the outer circumferential surface (lateral circumferential surface) of the mating protrusion 74. The first seal ridges 80 extend (are annularly arranged) along the entire circumference of the outer circumferential surface of the mating protrusion 74. The first seal ridges 80 are arranged in a plurality of lines (two seal lines in the illustrated embodiment) at intervals in the direction in which the mating protrusion 74 protrudes (in the direction in which the slits 64 pass through the grommet 58). It should be noted that only one first seal ridge 80 (i.e., only one seal line) may be provided. Alternatively, the three or more first seal ridges 80 (i.e., three or more seal lines) may be provided. The first seal ridges 80 arranged in the plurality of lines may have different heights (heights in which the first seal ridges 80 protrude from the outer circumferential surface of the mating protrusion 74).

In FIG. 4, the plurality of first seal ridges 80 protrude from the outer circumferential surface 74b of the mating protrusion 74, toward the inner circumferential surface of a mating recess 88b of the seal plate 60 described later. That is, the plurality of first seal ridges 80 are formed integrally with the mating protrusion 74. The plurality of first seal ridges 80 tightly contact the inner circumferential surface of the mating recess 88b along the entire periphery. In the structure, an air-tight and liquid-tight seal portion is formed between the outer circumferential surface 74b of the mating protrusion 74 and the inner circumferential surface of the mating recess 88b.

The tip (protruding end) of the first seal ridge 80 may be rounded so as to bulge in a direction in which the first seal ridge 80 protrudes. Hereafter, for the purpose of making a distinction between the one first seal ridge 80 on one of two lines and the other first seal ridge 80 on the other of the two lines, the first seal ridge 80 on the upper side (closer to the potting portion 62) will be referred to as the "upper seal 80a", and the first seal ridge 80 on the lower side "(farther from the potting portion 62)" will be referred to as the "lower seal 80b".

As shown in FIG. 4, the intermediate portion 78 is extended outward from an end opposite from the opening 14a of the mating protrusion 74, and then curved toward the opening 14a. In the structure, a ring shaped groove 82 is formed around the mating protrusion 74, between the mating protrusion 74 and the intermediate portion 78.

The flange 76 extends outward from the outer circumferential edge of the intermediate portion 78. The plurality of second seal ridges 84 (the plurality of seal lines) are annularly arranged in the plurality of lines along the flange 76, between the flange 76 and the accommodating case 14. In the first embodiment, the two second seal ridges 84 in two lines are provided. It should be noted that only one second seal ridge 84 (i.e., only one seal line) may be provided. Alternatively, three or more second seal ridges 84 (i.e., three or more seal lines) may be provided. The tip (protruding end) of the second seal ridge 84 may be rounded so as to bulge in the direction in which the second seal ridge 84 protrudes. Hereinafter, in the first embodiment, for the purpose of making a distinction between the one second seal ridge 84 on one of two lines and the other second seal ridge 84 on the other of the two lines, the second seal ridge 84 on the outer side will be referred to as the "outer seal 84a", and the second seal ridge 84 on the inner side will be referred to as the "inner seal 84b".

The second seal ridges 84 in the plurality of lines protrude from a surface 76a of the flange 76 facing the accommodating case 14 (lower side panel 46b) toward the outer surface of the accommodating case 14 (outer surface 46b1 of the lower side panel 46b). That is, the plurality of second seal ridges 84 are formed integrally with the flange 76.

The second seal ridges 84 tightly contact the outer circumferential surface (outer surface 46b1) of the accommodating case 14 along the entire circumference. In the structure, an air-tight and liquid-tight seal portion is formed between the flange 76 and the outer surface 46b1 of the accommodating case 14.

Figure 7:
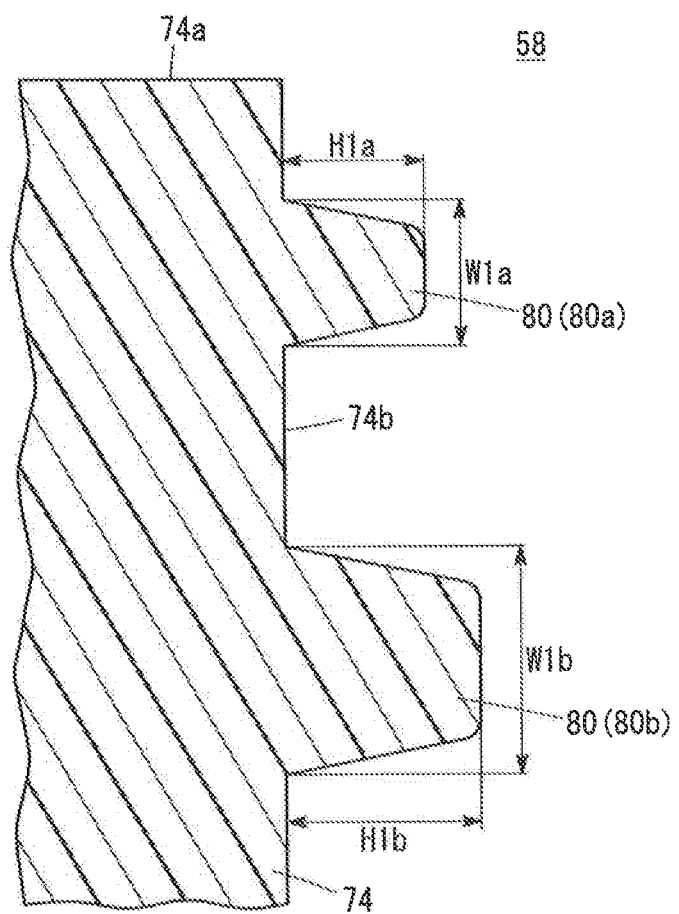
FIG. 7 is an enlarged cross sectional view showing first seal ridges.

As shown in FIG. 7, in a non-compressed state, the plurality of first seal ridges 80 (the plurality of seal lines) have different cross sections (sizes). Therefore, in the non-compression state, the plurality of first seal ridges 80 have different cross sectional areas. In this regard, when the first seal ridges 80 are "in the non-compressed state", no external force is applied to the first seal ridges 80, and no elastic deformation from the initial state occurs. That is, the "non-compressed state" is a state where the grommet 58 is not assembled to the accommodating case 14 and the seal plate 60, i.e., the state before the grommet 58 is assembled to the accommodating case 14 and the seal plate 60, or the state where the grommet 58 is detached from the accommodating case 14 and the seal plate 60. Further, the "cross sectional area" of the first seal ridge 80 is an area of the first seal ridge 80 in cross section (lateral cross section) perpendicular to the direction in which the first seal ridge 80 extends.

In the first embodiment, when the first seal ridges 80 are in the non-compressed state, the protruding height H1$b$ in lateral cross section of the lower seal 80$b$ (the seal provided on a side farther from the potting portion 62, of the adjacent first seal ridges 80 among the first seal ridges 80 arranged in the plurality of lines) is higher than the protruding height H1$a$ in lateral cross section of the upper seal 80$a$ (the seal provided on a side closer to the potting portion 62, of the adjacent first seal ridges 80 among the first seal ridges 80 arranged in the plurality of lines), over the entire first seal ridges 80 in the direction in which the first seal ridges 80 extend (at any position along the entire circumference of the first seal ridges 80). In this regard, the "protruding height" of the upper seal 80$a$ and the lower seal 80$b$ is the protruding height from a surface (the outer circumferential surface 74$b$ of the mating protrusion 74 in the first embodiment) on which the upper seal 80$a$ and the lower seal 80$b$ are provided.

The ratio of the protruding height H1$b$ of the lower seal 80$b$ to the protruding height H1$a$ of the upper seal 80$a$ is, e.g., in a range of 110% to 140%.

Further, in the first embodiment, when the first seal ridges 80 are in the non-compressed state, the width W1$b$ of the lower seal 80$b$ is larger than the width W1$a$ of the upper seal 80$a$, over the entire first seal ridges 80 in which the first seal ridges 80 extends (at any position along the entire circumference of the first seal ridges 80). The "width" of the upper seal 80$a$ and the "width" of the lower seal 80$b$ herein mean the dimensions in a direction perpendicular to the protruding height direction at the base of the upper seal 80$a$ and at the base of the lower seal 80$b$, respectively (the dimension in the direction in which the opening 14$a$ passes through the accommodating case 14).

The ratio of the width W1$b$ of the lower seal 80$b$ to the width W1$a$ of the upper seal 80$a$ is, e.g., in a range of 120% to 240%.

Figure 8:
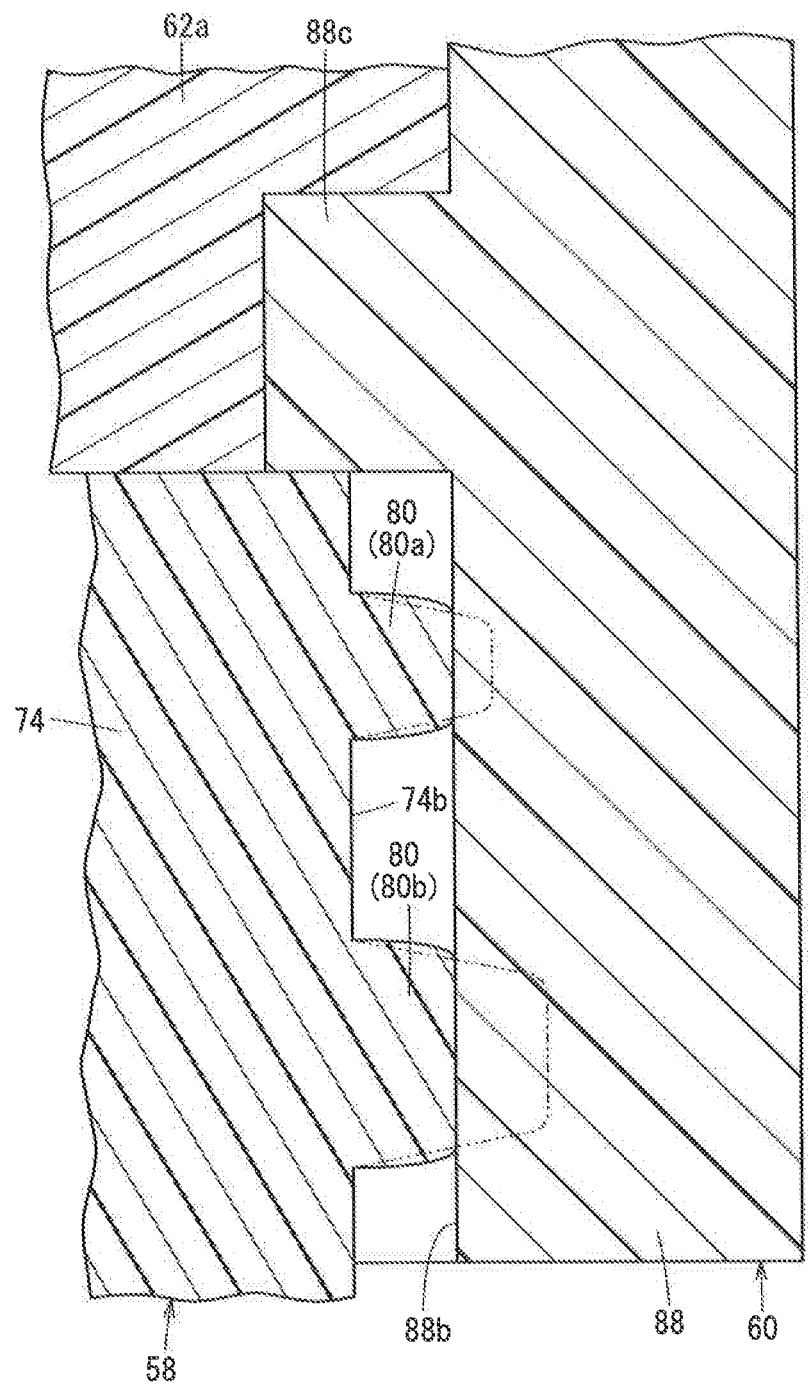
FIG. 8 is a cross sectional view showing the first seal ridges and components around the first seal ridges that are assembled together.

As shown in FIG. 4, in the state where the grommet 58 is attached to the accommodating case 14 (lower side panel 46$b$) and the seal plate 60, the grommet 58 is pressed against the accommodating case 14 through a bracket 86 (see FIG. 4) described later. Therefore, each of the first seal ridges 80 in the plurality of lines are compressed in the height direction, and placed in an elastically compressed state. As a result, as shown in FIG. 8, the first seal ridges 80 in the plurality of lines have the same protruding height from the outer circumferential surface 74$b$ of the mating protrusion 74. Therefore, the first seal ridges 80 in the plurality of lines have different compression ratios. In the first embodiment, the compression ratio of the larger lower seal 80$b$ is higher than the compression ratio of the smaller upper seal 80$a$. In FIG. 8, the cross sectional area of the lower seal 80$b$ is larger than the cross sectional area of the upper seal 80$a$. In FIG. 8, initial shapes of the first seal ridges 80 in the plurality of lines are denoted by imaginary lines.

Figure 9:
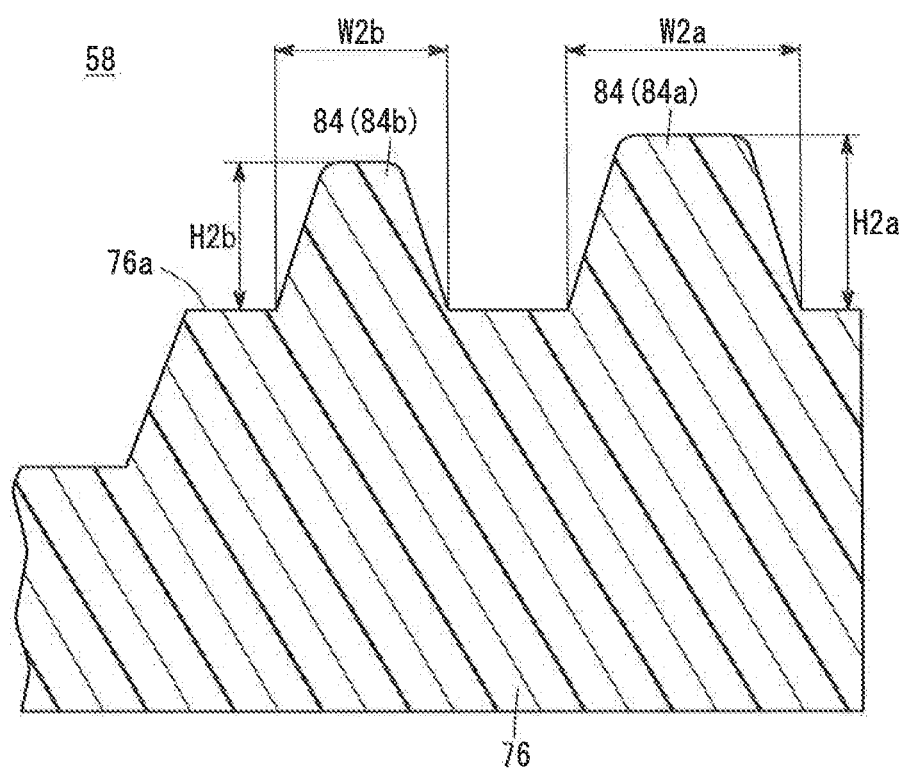
FIG. 9 is a cross sectional view showing second seal ridges and a flange, taken along a line IX-IX in FIG. 5.

As shown in FIG. 9, in a non-compressed state, the second seal ridges 84 in the plurality of lines have different cross sectional shapes (sizes). Therefore, in the non-compressed state, the second seal ridges 84 in the plurality of lines have different cross sectional areas. In this regard, when the second seal ridges 84 are "in the non-compressed state", no external force is applied to the second seal ridges 84, and no elastic deformation from the initial shape occurs. That is, the "non-compressed state" is a state where the grommet 58 is not assembled to the accommodating case 14, i.e., the state before the grommet 58 is assembled to the accommodating case 14, or the state where the grommet 58 is detached from the accommodating case 14. The "cross sectional area" of the second seal ridge 84 is an area of the second seal ridge 84 in cross section (lateral cross section) perpendicular to the direction in which the second seal ridge 84 extends.

In the first embodiment, when the second seal ridge 84 is in the non-compressed state, the height H2$a$ in lateral cross section of the outer seal 84$a$ (the seal provided on the outer side, of the adjacent second seal ridges 84 among the second seal ridges 84 arranged in the plurality of lines) is higher than the height H2$b$ in lateral cross section of the inner seal 84$b$ (the seal provided on the inner side, of the adjacent second seal ridges 84 among the second seal ridges 84 in the plurality of lines), over the entire second seal ridges 84 in the direction in which the second seal ridges 84 extend (at any position along the entire circumference of the second seal ridges 84). In this regard, the "height" of the outer seal 84$a$ and the inner seal 84$b$ is the protruding height from the flange 76 (surface 76$a$).

The ratio of the height H2$a$ of the outer seal 84$a$ to the height H2$b$ of the inner seal 84$b$ is, e.g., in a range of 110% to 140%.

Further, in the first embodiment, when the second seal ridges 84 are in the non-compressed state, the width W2$a$ of the outer seal 84$a$ is larger than the width W2$b$ of the inner seal 84$b$, over the entire second seal ridges 84 in the direction in which the second seal ridges 84 extend (at any position along the entire circumference of the second seal ridges 84). The "width" of the outer seal 84$a$ and the "width" of the inner seal 84$b$ herein mean the dimensions in a direction perpendicular to the height direction at the base of the outer seal 84$a$ and at the base of the inner seal 84$b$, respectively (the dimension in the direction in which the outer seal 84$a$ and the inner seal 84$b$ are spaced away from each other).

The ratio of the width W2$a$ of the outer seal 84$a$ to the width W2$b$ of the inner seal 84$b$ is, e.g., in a range of 120% to 240%.

Figure 10:
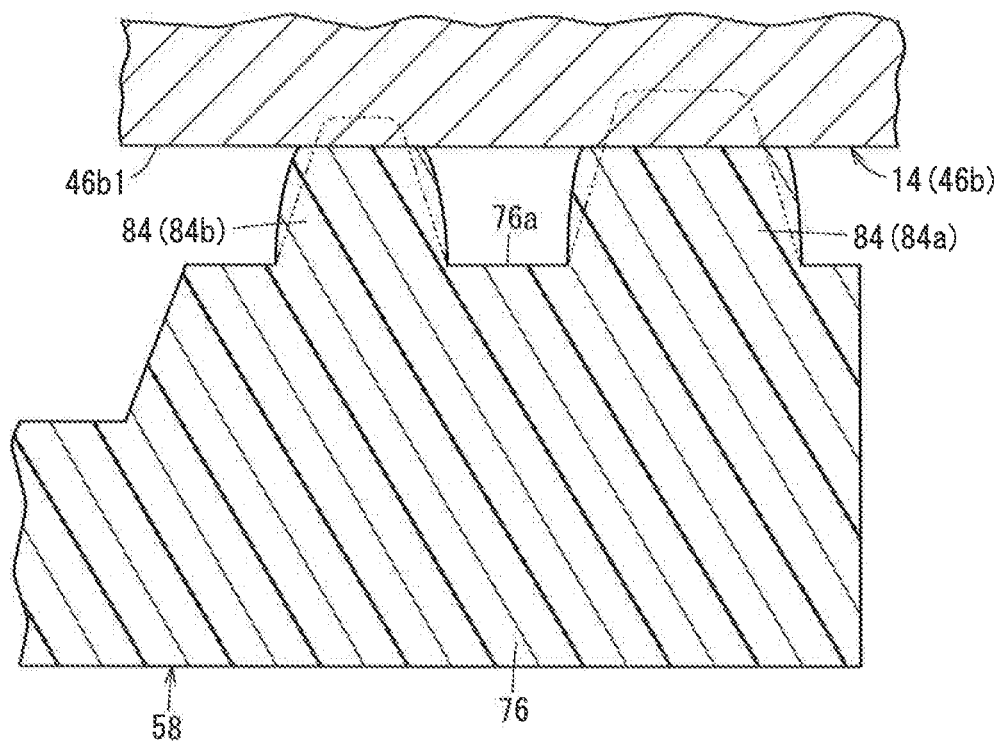
FIG. 10 is a cross sectional view showing the second seal ridges and the flange that are assembled together.

As shown in FIG. 10, in the state where the grommet 58 is attached to the accommodating case 14 (lower side panel 46$b$), the grommet 58 is pressed against the accommodating case 14 by the bracket 86 (see FIG. 4) described later. Therefore, each of the second seal ridges 84 in the plurality of lines are compressed in the height direction, and placed in an elastically compressed state. As a result, the second seal ridges 84 in the plurality of lines have the same protruding height from the flange 76 (surface 76$a$). Therefore, the second seal ridges 84 in the plurality of lines have different compression ratios. In the first embodiment, the compression ratio of the larger outer seal 84$a$ is higher than the compression ratio of the smaller inner seal 84$b$. In FIG. 10, the cross sectional area of the outer seal 84$a$ is larger than the cross sectional area of the inner seal 84$b$. In FIG. 10, initial shapes of the second seal ridges 84 in the plurality of lines are denoted by imaginary lines.

For example, the grommet 58 is made of seal material, cushion material, or packing material, having elasticity, such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 4, the grommet 58 is fixed to the accommodating case 14 (lower side panel 46$b$) by the bracket 86. The bracket 86 is a plate member having a hole 86$a$ passing through the plate member in the thickness direction. The bracket 86 is firmly fixed to the accommodating case 14 by fixing members (not shown) such as screws. The bracket 86 is made of material (e.g., hard resin, metal, etc.) which is harder than the material of the grommet 58.

A part (the mating protrusion 74 and the intermediate portion 78 described above) of the grommet 58 is inserted into the hole 86a, and the part of the grommet 58 inserted into the hole 86a protrudes from the hole 86a of the bracket 86. The bracket 86 abuts against the flange 76 of the grommet 58, and presses the flange 76 against the outer surface 46b1 of the accommodating case 14.

The seal plate 60 positions the grommet 58 in the accommodating case 14 in a manner that the grommet 58 is positioned at a suitable position relative to the opening 14a. The seal plate 60 is attached to the opening 14a.

Figure 11A:
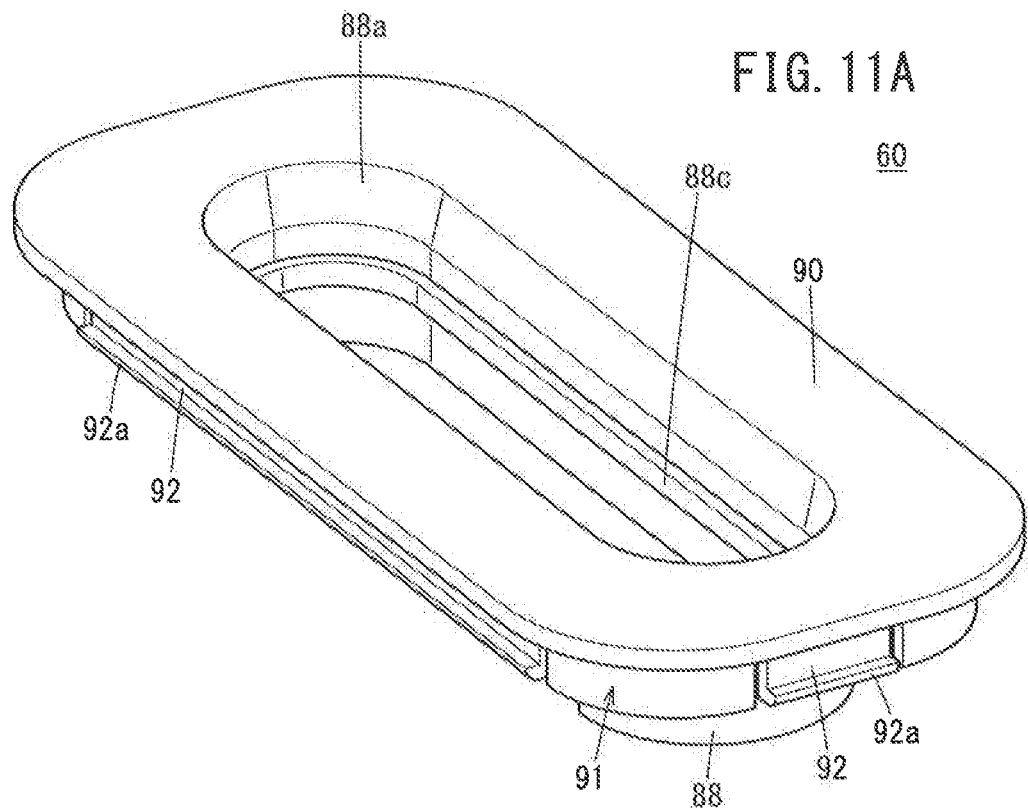
FIG. 11A is a perspective view showing a seal plate of the seal structure as viewed from an upper surface of the seal plate.
Figure 11B:
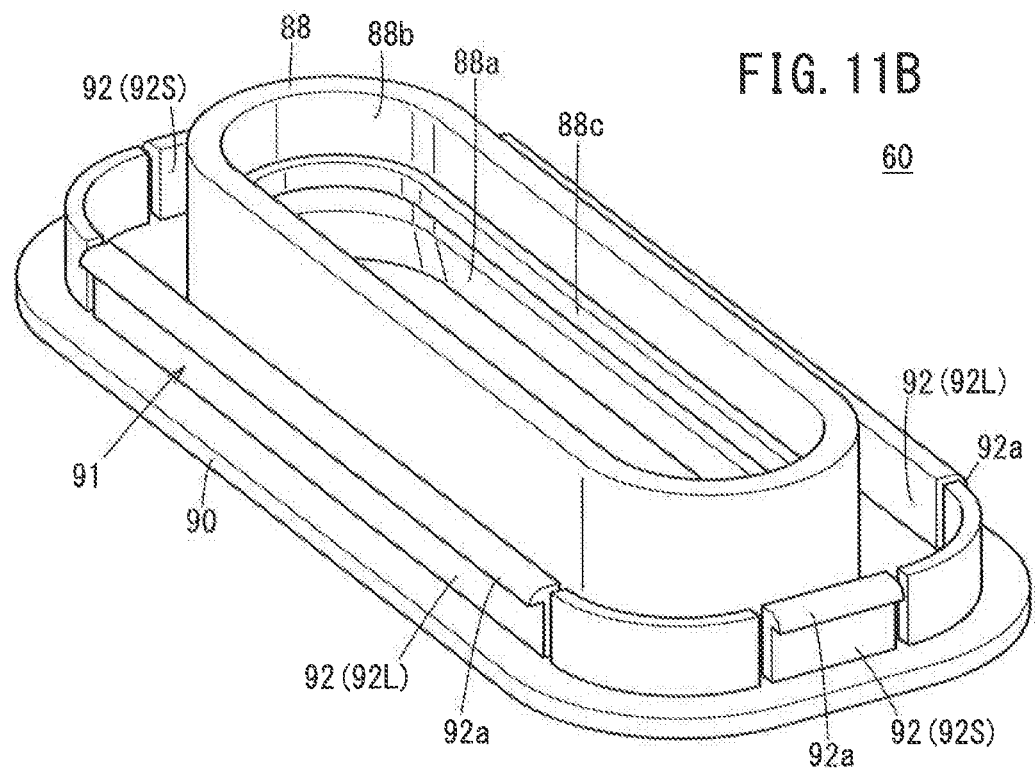
FIG. 11B is a perspective view showing the seal plate of the seal structure as viewed from a lower surface of the seal plate.

As shown in FIGS. 4, 11A, and 11B, the seal plate 60 includes a tubular circumferential wall 88, an outer plate 90 protruding outward from the tubular circumferential wall 88, and an engagement wall 92 protruding from the outer plate 90 to face the tubular circumferential wall 88 at a distance from the tubular circumferential wall 88. As in the case of the above described grommet 58, the seal plate 60 has a shape elongated in one direction. As shown in FIGS. 11A and 11B, the tubular circumferential wall 88 is elongated in the longitudinal direction of the seal plate 60.

As shown in FIG. 4, a plurality of flat cables 54 are inserted through the inside of the tubular circumferential wall 88, and led out of the accommodating case 14.

An accommodating recess 88a is provided at one end of the tubular circumferential wall 88 (inside of the accommodating case 14). The potting portion 62 is accommodated (filled) in the accommodating recess 88a. One end of the accommodating recess 88a is tapered. A mating recess 88b is provided at the other end of the tubular circumferential wall 88 (outside of the accommodating case 14). The mating recess 88b is opened toward the grommet 58. The mating protrusion 74 is fitted into the mating recess 88b. Therefore, the tubular circumferential wall 88 functions as a holder portion for holding the grommet 58 inside a claw 92a described later. The tubular circumferential wall 88 protrudes beyond an insertion portion 91 described later, toward the grommet 58.

The accommodating recess 88a and the mating recess 88b are connected to each other inside the tubular circumferential wall 88, and form a through hole passing through the seal plate 60 in the thickness direction. A protrusion wall 88c protruding inward is formed on the inner surface of the tubular circumferential wall 88. The protrusion wall 88c forms a boundary wall between the accommodating recess 88a and the mating recess 88b.

The inner circumferential portion of the mating recess 88b contacts (tightly contacts) the outer circumferential portion (the above described first seal ridges 80) of the mating protrusion 74 over the entire circumference. In the structure, a gas-tight and liquid-tight seal portion is formed between the inner circumferential portion of the mating recess 88b and the outer circumferential portion of the mating protrusion 74.

The outer plate 90 protrudes outward from the one end of the tubular circumferential wall 88. The outer edge portion of the outer plate 90 faces the inner surface 46b2 (inner surface around the opening 14a) of the lower side panel 46b. The engagement wall 92 is elastically deformable inward (toward the tubular circumferential wall 88), and inserted into the opening 14a.

A plurality of engagement walls 92 are provided along the outer circumference of the seal plate 60. As shown in FIG. 11B, the engagement walls 92 include a pair of engagement walls 92L extending in parallel to each other in the longitudinal direction of the seal plate 60, and a pair of engagement walls 92S extending in parallel to each other in the lateral direction of the seal plate 60. The pair of engagement walls 92S are shorter than the pair of engagement walls 92L.

As shown in FIG. 4, the seal plate 60 is attached to the opening 14a from the side opposite from the grommet 58 (from the inside of the accommodating case 14 in FIG. 4). The seal plate 60 includes an insertion portion 91 which extends along the shape (non-circular shape) of the opening 14a and is inserted into the opening 14a. The engagement walls 92 form at least part of the insertion portion 91. The outer surface 91a of the insertion portion 91 contacts the inner circumferential surface 14as of the opening 14a, or faces the inner circumferential surface 14as through a small gap as shown in FIG. 4.

The engagement wall 92 includes the claw (engagement portion) 92a. The claw 92a is engaged with the outer surface (the outer surface of an inner circumferential edge 14d around the opening 14a) of the lower side panel 46b. The claw 92a is engaged with the inner circumferential edge 14d inside the second seal ridges 84. When the grommet 58 is attached to the opening 14a, the engagement wall 92 is elastically deformed inward. Thus, the claw 92a moves beyond the inner circumferential surface 14as of the opening 14a, and the claw 92a is engaged with the inner circumferential edge 14d.

The claw 92a and the second seal ridges 84 contact a surface of the accommodating case 14 (inner circumferential edge 14d) on one side. The lower side panel 46b (edge around the opening 14a) is held between the outer plate 90 and the claw 92a. Thus, the seal plate 60 is fixed to the lower side panel 46b (opening 14a).

The seal plate 60 is made of material which is harder than that of the grommet 58. For example, the seal plate 60 is made of hard resin. Examples of the material of the seal plate 60 include PPS (polyphenylene sulfide) or PEEK (polyetheretherketone) based engineering plastics or super engineering plastics, etc.

As shown in FIG. 4, the potting portion 62 is accommodated (filled) in the accommodating recess 88a adjacent to the mating protrusion 74 of the grommet 58. The plurality of flat cables 54 are sealed by the potting portion 62. The potting portion 62 tightly contacts the outer peripheral portion of each of the flat cables 54. Therefore, spaces between the adjacent flat cables 54 are also filled with the potting portion 62. Further, the potting portion 62 tightly contacts a top surface 74a (protruding end surface) of the mating protrusion 74 of the grommet 58, and tightly contacts the inner circumferential surface of the accommodating recess 88a.

The potting portion 62 includes a first potting layer 62a adjacent to the grommet 58, and a second potting layer 62b adjacent to the first potting layer 62a on the opposite side from the grommet 58. That is, the potting portion 62 includes two potting layers stacked in the direction in which the opening 14a passes through the accommodating case 14. In the first embodiment, the thickness of the second potting layer 62b is larger than the thickness of the first potting layer 62a.

The viscosity of the resin material of the first potting layer 62a (viscosity of the first potting material in the liquid state (before hardening) which is poured into the accommodating recess 88a for forming the first potting layer 62a) is higher than the viscosity of the resin material of the second potting layer 62b (viscosity of the second potting material in the liquid state (before hardening) which is poured into the accommodating recess 88a for forming the second potting layer 62b). The hardness of the first potting layer 62a formed by hardening the first potting material is higher than the hardness of the second potting layer 62b formed by hardening the second potting material.

Examples of the resin material (potting material) of the first potting layer 62a and the second potting layer 62b include silicone based potting material, urethane based potting material, epoxy based potting material, etc. The potting material preferably should be two-component type potting material which is hardened by chemical reaction induced when a base agent and a hardening agent are mixed together.

In the step of forming the potting portion 62, the seal plate 60 is fixed to the opening 14a (accommodating case 14), the mating protrusion 74 of the grommet 58 is fitted into the mating recess 88b of the seal plate 60, and the flat cables 54 are inserted into the slits 64, respectively. In this state, the potting material is poured into the accommodating recess 88a.

Next, operation of the fuel cell stack 10 having the above structure will be described below.

In FIG. 2, an oxygen-containing gas is supplied to the oxygen-containing gas flow field 30 of the power generation cell 12 through the oxygen-containing gas supply passage (not shown). A fuel gas such as a hydrogen-containing gas is supplied to the fuel gas flow field 28 of the power generation cell 12 through the fuel gas supply passage (not shown). Further, a coolant such as pure water, ethylene glycol or oil is supplied to the coolant supply passages 32a of the power generation cell 12 (see FIG. 1).

Therefore, the oxygen-containing gas moves along the oxygen-containing gas flow field 30, and the oxygen-containing gas is supplied to the cathode 26 of the membrane electrode assembly 16. In the meanwhile, the fuel gas moves along the fuel gas flow field 28, and the fuel gas is supplied to the anode 24 of the membrane electrode assembly 16. Thus, in the membrane electrode assembly 16, the oxygen-containing gas supplied to the cathode 26 and the fuel gas supplied to the anode 24 are consumed in the electrochemical reactions at catalyst layers of the cathode 26 and the anode 24 for generating electricity.

Then, the oxygen-containing gas supplied to and consumed at the cathode 26 of the membrane electrode assembly 16 is discharged through the oxygen-containing gas discharge passage (not shown). In the meanwhile, the fuel gas supplied to and consumed at the anode 24 of the membrane electrode assembly 16 is discharged through the fuel gas discharge passage (not shown).

Further, the coolant supplied into the coolant flow field 34 moves through the coolant flow field 34 to cool the membrane electrode assembly 16, and thereafter, the coolant is discharged through the coolant discharge passages 32b (see FIG. 1).

During operation (power generation) of the fuel cell stack 10, as shown in FIG. 2, each of the power generation cells 12 is connected to a cell voltage detection device (not shown) through the flat cable 54 connected to the cell voltage detection terminal 50. Therefore, the voltage (electromotive force) of each power generation cell 12 is measured by the cell voltage detection device.

In the fuel cell stack 10 according to the first embodiment, as shown in FIG. 4, the grommet 58 is positioned with respect to the opening 14a by the seal plate 60 (positioning member) attached to the accommodating case 14. In the structure, the grommet 58 is positioned by the seal plate 60, and thus, positional displacement of the grommet 58 relative to the opening 14a is suppressed greatly. Therefore, the grommet 58 is not damaged by friction against the accommodating case 14, and it is possible to prevent the grommet 58 from being dropped into the opening 14a (In the case where a step 14c is provided on the accommodating case 14, it is also possible to prevent the grommet 58 from riding on the step 14c). Therefore, since the grommet 58 is prevented from being assembled in a state where the grommet 58 is inclined, it is possible to achieve the desired sealing performance easily. Further, at the time of assembling, since the grommet 58 can be easily positioned relative to the opening 14a, shortening of time required for performing assembling operation can be expected as well.

In the first embodiment, the seal plate 60 is attached to the opening 14a. Since the seal plate 60 is positioned at the opening 14a, it is possible to suppress positional displacement of the grommet 58 to a greater extent.

In the first embodiment, the opening 14a has a non-circular shape, and the seal plate 60 includes the insertion portion 91. The insertion portion 91 extends along the shape of the opening 14a, and is inserted into the opening 14a. In the structure, the grommet 58 is positioned relative to the opening 14a in the rotation direction (because rotation of the grommet 58 relative to the opening 14a is restricted) as well as in the plane direction. Therefore, it is possible to suppress the positional displacement of the grommet 58 to a greater extent.

In the first embodiment, the seal plate 60 includes the claw 92a (engagement portion) which is engaged with the inner circumferential edge 14d of the opening 14a, and the tubular circumferential wall 88 (holder portion) holding the grommet 58 inside the claw 92a. Therefore, since the seal plate 60 is held by the opening 14a, and the grommet 58 is held by the tubular circumferential wall 88, it is possible to suppress the positional displacement of the grommet 58 suitably to a greater extent.

In the first embodiment, the claw 92a and the second seal ridge 84 contact the surface of the accommodating case 14 on one side, and the claw 92a is engaged with the inner circumferential edge 14d inside the second seal ridges 84. Therefore, it is possible to fix the seal plate 60 at the opening 14a suitably, without inhibiting the sealing performance of the second seal ridges 84.

In the first embodiment, the grommet 58 includes the mating protrusion 74 protruding toward the seal plate 60. The seal plate 60 includes the mating recess 88b opened toward the grommet 58 and into which the mating protrusion 74 is fitted. In the structure, by fitting the mating recess 88b and the mating protrusion 74 together, since the grommet 58 is held accurately, it is possible to suppress the positional displacement of the grommet 58 more suitably.

In the first embodiment, the flat cables 54 are inserted through the mating protrusion 74. In the structure, the mating protrusion 74 has a function of being held by the seal plate 60, and also has a function of allowing the flat cables 54 to be inserted through the mating protrusion 74. Therefore, it is possible to simplify the structure of the grommet 58.

In the first embodiment, the seal plate 60 is attached to the opening 14a, from the side opposite to the grommet 58. Therefore, it is possible to assemble the seal plate 60 and the grommet 58 to the opening 14a of the accommodating case 14 easily.

In the first embodiment, the bracket 86 pressing the outer circumferential portion of the grommet 58 is fixed to the accommodating case 14. Therefore, it is possible to suitably fix the grommet 58 to the accommodating case 14, and improve the sealing performance between the accommodating case 14 and the grommet 58.

In the fuel cell stack 10, as shown in FIG. 4, the outer peripheral portions of the flat cables 54 passing through the opening 14a of the accommodating case 14 are sealed hermetically by the potting portion 62 including the first potting layer 62a and the second potting layer 62b. Therefore, it is possible to reduce the size of the grommet 58 used for adopting the flat cables 54, and realize a seal structure 56 without any gas leakage (leakage of reactant gases such as a hydrogen-containing gas) from the accommodating case 14.

In FIG. 4, as shown by dashed arrows, a reactant gas such as a hydrogen gas may enter the grommet 58 side from the accommodating case 14 through a space between the accommodating case 14 (lower side panel 46b) and the seal plate 60.

In this regard, in the first embodiment, as shown in FIG. 4, the first seal ridges 80 are provided on the outer circumferential portion of the mating protrusion 74 of the grommet 58, and the first seal ridges 80 tightly contact the inner circumferential portion of the mating recess 88b of the seal plate 60. Therefore, it is possible to prevent the reactant gas such as a hydrogen gas from passing through a gap between the mating protrusion 74 and the mating recess 88b and being leaked from the accommodating case 14 to the outside through the slits 64.

In particular, in the first embodiment, since the grommet 58 includes the first seal ridges 80 arranged in the plurality of lines, it is possible to suppress improper assembling due to inclination of the grommet 58, and achieve the desired sealing performance. That is, unlike the first embodiment, in the case where the seal lip between the mating protrusion 74 and the mating recess 88b has a single-seal-line structure (in the case where the first seal ridge 80 only in one line is provided), if the seal has a height sufficient to assemble the seal at a tolerance height that allows the durability to be guaranteed, the grommet 58 may be assembled obliquely, depending on the assembling method. In this case, it is likely that the seal lip is not compressed, or some part of the seal lip is not compressed sufficiently, and consequently, the desired sealing performance may not be obtained.

In contrast, in the first embodiment, as described above, the grommet 58 includes the first seal ridges 80 arranged in the plurality of lines. That is, a multiple-seal-line structure is provided between the mating protrusion 74 and the mating recess 88b. Therefore, even if the seal has a height sufficient to assemble the seal at a tolerance height which allows the durability to be guaranteed, it is possible to suppress a situation where the grommet 58 is assembled to the accommodating case 14 obliquely. Therefore, improper assembling of the grommet 58 is suppressed, and it is possible to reliably achieve the desired sealing performance.

Further, in the first embodiment, in the non-compressed state, the first seal ridges 80 in the plurality of lines have different cross sectional shapes. Therefore, even if there is any change in the seal tightening margin (compression condition) due to the tolerance of component parts or variation in assembling, it becomes possible to improve the robustness of the air-tight seal (hydrogen seal). That is, the seal compression ratio varies significantly due to the tolerance of component parts or variation in assembling. Under the circumstances, if the seal compression ratio becomes too high due to the tolerance of component parts or variation in assembling, cracking of the seal may occur undesirably. Conversely, if the seal compression ratio becomes too low, permanent set-in fatigue may occur in the seal, and in the worst case, leakage of hydrogen may occur. Further, in the case where the seal height is not sufficient, it is difficult to assemble the seal within the tolerance height which guarantees the durability.

In contrast, in the first embodiment, as described above, in the non-compressed state, the first seal ridges 80 in the plurality of lines have different cross sectional shapes. Therefore, even if the seal compression ratio varies due to the tolerance of component parts or variation in assembling, it is possible to achieve the desired sealing performance in at least one of the first seal ridges 80. That is, even if the seal compression ratio becomes too high in the larger first seal ridge 80 (the lower seal 80b having a larger height and width in the first embodiment), and cracking occurs, since the seal compression ratio is not so high (within a suitable range) in the smaller first seal ridge 80 (the upper seal 80a), no cracking occurs, and thus it is possible to maintain the desired sealing performance suitably. Further, even if the seal compression ratio in the smaller first seal ridge 80 (upper seal 80a) becomes excessively small, since the larger first seal ridge 80 (lower seal 80b) has a suitable seal compression ratio, the desired sealing performance can be maintained suitably.

Further, in the first embodiment, in the non-compressed state, the first seal ridges 80 (upper seal 80a and lower seal 80b) which are adjacent to each other among the first seal ridges 80 in the plurality of lines are dimensioned such that the seal provided farther from the potting portion 62 (lower seal 80b) is larger than the seal (upper seal 80a) provided closer to the potting portion 62 in respect of the protruding height in lateral cross section and the width in the direction perpendicular to the direction of the protruding height. Therefore, it is possible to more suitably prevent the situation where the grommet 58 is assembled to the accommodating case 14 obliquely. Accordingly, it is possible to suppress improper assembling of the grommet 58, and reliably achieve the desired sealing performance.

Further, in the first embodiment, the second seal ridges 84 are provided on the flange 76 of the grommet 58, and the second seal ridges 84 tightly contact the outer surface of the accommodating case 14. In the structure, it is possible to prevent the reactant gas such as the hydrogen gas from passing through a gap between the flange 76 of the grommet 58 and the outer surface of the accommodating case 14, and being leaked from the accommodating case 14 to the outside.

In particular, in the first embodiment, since the second seal ridges 84 arranged in the plurality of lines are provided between the flange 76 of the grommet 58 and the accommodating case 14, it is possible to suppress improper assembling due to inclination of the grommet 58, and achieve the desired sealing performance. That is, unlike the first embodiment, in the case where the seal lip has a single-seal-line structure (in the case where the second seal ridge 84 only in one line is provided), if the seal has a height sufficient to assemble the seal at a tolerance height that allows the durability to be guaranteed, the grommet 58 may be assembled obliquely, depending on the assembling method. In this case, it is likely that the seal lip is not compressed, or some part of the seal lip is not compressed sufficiently, and consequently, the desired sealing performance may not be obtained.

In contrast, in the first embodiment, as described above, the second seal ridges 84 are arranged in the plurality of lines between the flange 76 of the grommet 58 and the accommodating case 14. That is, a multiple-seal-line structure is provided. Therefore, even if the seal has a height sufficient to assemble the seal at a tolerance height which guarantees the durability, it is possible to suppress the situation where the grommet 58 is assembled to the accommodating case 14 obliquely. Therefore, it is possible to suppress improper assembling of the grommet 58, and achieve the desired sealing performance reliably.

Further, in the first embodiment, in the non-compressed state, the second seal ridges 84 in the plurality of lines have different cross sectional shapes. Therefore, even if there is any change in the seal tightening margin (compression condition) due to the tolerance of component parts or variation in assembling, it becomes possible to improve the robustness of the air-tight seal (hydrogen seal). That is, the seal compression ratio varies significantly due to the tolerance of component parts or variation in assembling. Under the circumstances, if the seal compression ratio becomes too high due to the tolerance of component parts or variation in assembling, cracking of the seal may occur undesirably. Conversely, if the seal compression ratio becomes too low, permanent set-in fatigue may occur in the seal, and in the worst case, leakage of hydrogen may occur. Further, in the case where the seal height is not sufficient, it is difficult to assemble the seal within the tolerance height which guarantees the durability.

In contrast, in the first embodiment, as described above, in the non-compressed state, the second seal ridges 84 in the plurality of lines have different cross sectional shapes. Therefore, even if the seal compression ratio varies due to the tolerance of component parts or variation in assembling, it is possible to achieve the desired sealing performance in at least one of the second seal ridges 84. That is, even if the seal compression ratio becomes too high in the larger second seal ridge 84 (the outer seal 84a having a larger height and width in the first embodiment), and cracking occurs, since the seal compression ratio is not so high (within a suitable range) in the smaller second seal ridge 84 (the inner seal 84b), no cracking occurs, and thus it is possible to maintain the desired sealing performance suitably. Further, even if the seal compression ratio in the smaller second seal ridge 84 (inner seal 84b) becomes excessively small, since the larger second seal ridge 84 (outer seal 84a) has a suitable seal compression ratio, the desired sealing performance can be maintained suitably.

Further, in the first embodiment, in the non-compressed state, the second seal ridges 84 (outer seal 84a and inner seal 84b) which are adjacent to each other among the second seal ridges 84 in the plurality of lines are dimensioned such that the seal provided on the outside (outer seal 84a) is larger than the seal on the inner side (inner seal 84b) in respect of the protruding height in lateral cross section from the flange 76 and the width in the direction perpendicular to the protruding height. Therefore, it is possible more suitably to prevent the situation where the grommet 58 is assembled to the accommodating case 14 obliquely. Accordingly, it is possible to suppress improper assembling of the grommet 58, and it is possible to achieve the desired sealing performance.

As shown in FIG. 4, the outer peripheral portion of the flat cable 54 passing through the opening 14a of the accommodating case 14 is sealed hermetically by the potting portion 62. In the structure, it is possible to reduce the size of the grommet 58 used for adopting of the flat cable 54, and achieve the seal structure 56 without any gas leakage (leakage of a reactant gas such as a hydrogen-containing gas) from the accommodating case 14.

Further, in the first embodiment, the seal plate 60 is provided at the opening 14a. The seal plate 60 tightly contacts the grommet 58, and has the accommodating recess 88a. Further, the potting portion 62 is accommodated in the accommodating recess 88a. In the structure, by the seal plate 60 having the accommodating recess 88a, it is possible to easily provide an area sufficient for forming a potting layer around the flat cable 54 passing through the opening 14a. Accordingly, the outer peripheral portion of the flat cable 54 can be sealed more suitably.

Further, in the first embodiment, as shown in FIG. 4, the flat cables 54 are inserted into the plurality of slits 64 arranged in parallel at intervals, respectively. In the structure, the flat cables 54 are held at intervals by the plurality of slits 64. Therefore, the space between the adjacent flat cables 54 among the plurality of flat cables 54 are sealed by the potting portion 62 as well. Accordingly, the desired sealing performance is achieved.

Further, in the first embodiment, the viscosity of the resin material of the first potting layer 62a is higher than the viscosity of the resin material of the second potting layer 62b. Therefore, at the time of forming the potting portion 62, since the viscosity of the potting material (resin material of the first potting layer 62a) initially filled is relatively high, it is possible to prevent the potting material from flowing to the outside through the slits 64. In the step of forming the potting portion 62, the seal plate 60 is fixed to the opening 14a (accommodating case 14), the mating protrusion 74 of the grommet 58 is fitted into the mating recess 88b of the seal plate 60, and the plurality of flat cables 54 are inserted separately into the plurality of slits 64. In this state, a potting material is poured into the accommodating recess 88a.

Further, at the time of forming the potting portion 62, since the viscosity of the potting material (resin material of the second potting layer 62b) filled next is relatively low, the potting material can be filled between the adjacent flat cables 54 among the plurality of flat cables 54 in a short period of time. Further, since the viscosity is relatively low, the potting material can be filled in the gap reliably, and the desired sealing performance can be obtained. Accordingly, it is possible to suitably form the potting portion 62 which achieves the high sealing performance.

Additionally, in the first embodiment, as shown in FIGS. 6A and 6B, the slit 64 includes constricted portions (narrow parts 68, lip parts 66). By providing the constricted portions, at the time of forming the potting portion 62, it is possible to more suitably prevent the potting material from being leaked to the outside through the slits 64.

Figure 12:
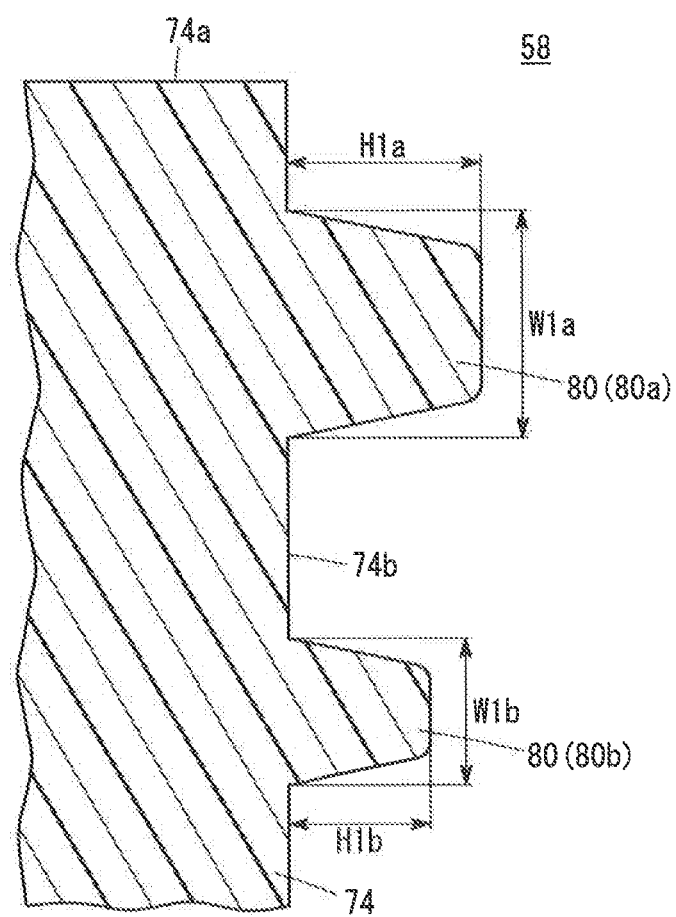
FIG. 12 is an enlarged cross sectional view showing first seal ridges according to a modified example.

The size relationship between the upper seal 80a and the lower seal 80b is not limited to the above described structure. Therefore, for example, as shown in FIG. 12, the upper seal 80a may be larger than the lower seal 80b. That is, in the first seal ridges 80 in the plurality of lines shown in FIG. 12, in the non-compressed state, the protruding height H1a of the upper seal 80a in lateral cross section is higher than the protruding height H1b of the lower seal 80b in lateral cross section, and the width W1a of the upper seal 80a in lateral cross section is larger than the width W1b of the lower seal 80b in lateral cross section.

Alternatively, though the protruding height H1b of the lower seal 80b is larger than the protruding height H1a of the upper seal 80a, the width W1b of the lower seal 80b may be smaller than the width W1a of the upper seal 80a. Alternatively, though the protruding height H1a of the upper seal 80a is larger than the protruding height H1b of the lower seal 80b, the width W1a of the upper seal 80a may be smaller than the width W1b of the lower seal 80b.

In the non-compressed state, the seals that are adjacent to each other, among the first seal ridges 80 in the plurality of lines may have the same height, but have different widths. Alternatively, in the non-compressed state, the seals that are adjacent to each other, among the first seal ridges 80 in the plurality of lines may have different heights, but have the same width.

Figure 13:
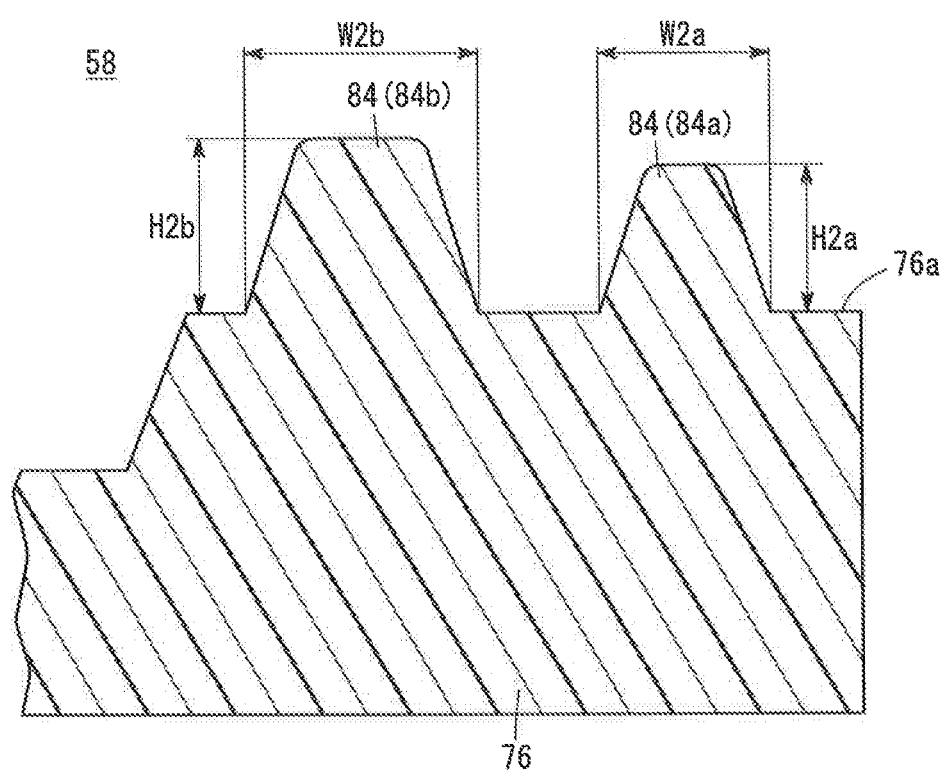
FIG. 13 is a cross sectional view showing second seal ridges and a flange according to the modified example.

The size relationship between the outer seal 84a and the inner seal 84b is not limited to the above described structure. Therefore, as shown in FIG. 13, the inner seal 84b may be larger than the outer seal 84a. That is, in the second seal ridges 84 in the plurality of lines shown in FIG. 13, in the non-compressed state, the height H2b of the inner seal 84b in lateral cross section is higher than the height H2a of the outer seal 84a in lateral cross section, and the width W2b of the inner seal 84b in lateral cross section is larger than the width W2a of the outer seal 84a in lateral cross section.

Alternatively, though the height H2a of the outer seal 84a is larger than height H2b of the inner seal 84b, the width W2a of the outer seal 84a may be smaller than the width W2b of the inner seal 84b. Alternatively, though the height H2b of the inner seal 84b is larger than the height H2a of the outer seal 84a, the width W2b of the inner seal 84b may be smaller than the width W2a of the outer seal 84a.

The shapes of the outer seal 84a and the inner seal 84b may be set in a manner that, though the height H2a of the outer seal 84a and the height H2b of the inner seal 84b are the same, the width W2a of the outer seal 84a and the width W2b of the inner seal 84b are different. Alternatively, the shapes of the outer seal 84a and the inner seal 84b may be determined in a manner that, though the width W2a of the outer seal 84a and the width W2b of the inner seal 84b are the same, the height H2a of the outer seal 84a and the height H2b of the inner seal 84b are different.

Figure 14:
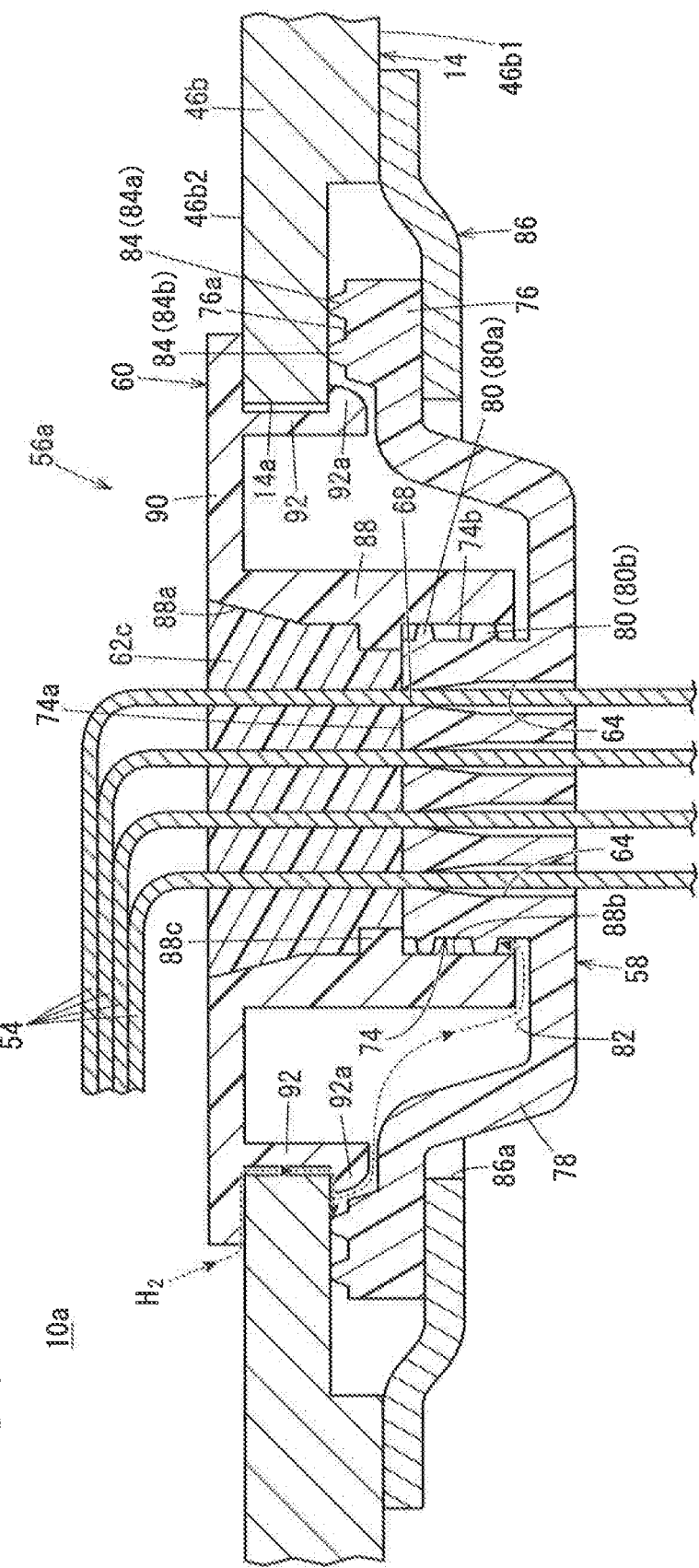
FIG. 14 is a cross sectional view showing a seal structure of a fuel cell stack according to a second embodiment.

In the first embodiment, the potting portion 62 have a dual layer structure including the first potting layer 62a and the second potting layer 62b, and the first potting layer 62a and the second potting layer 62b have different physical properties (hardness). Alternatively, as in the case of the fuel cell stack 10a according to a second embodiment shown in FIG. 14, a potting portion 62c having a single layer structure may be provided. That is, a seal structure 56a of the fuel cell stack 10a includes the potting portion 62c having a single layer structure which does not have a plurality of potting layers of different hardness.

Figure 15:
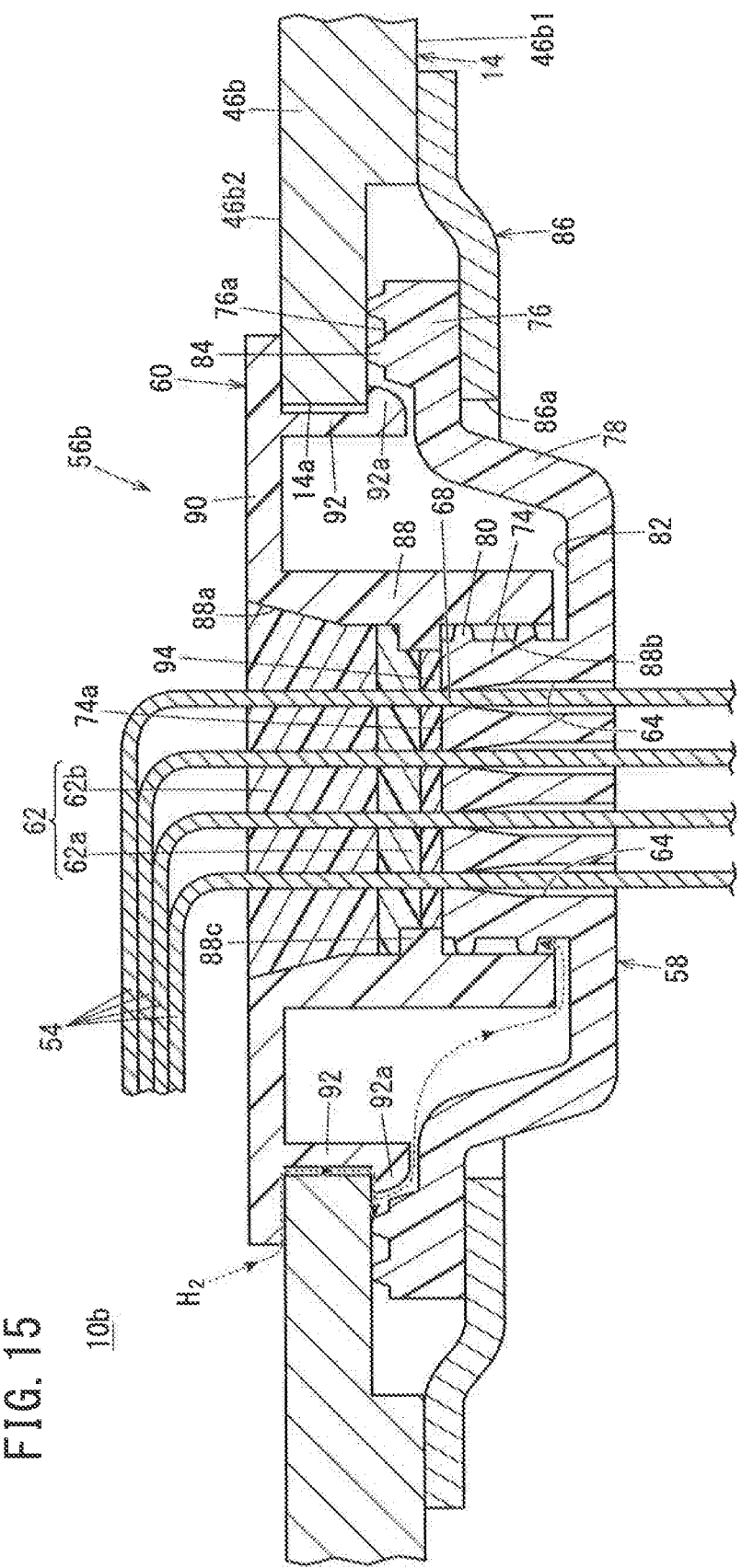
FIG. 15 is a cross sectional view showing a seal structure of a fuel cell stack according to a third embodiment.

As shown in FIG. 15, a seal structure 56b of a fuel cell stack 10b according to a third embodiment includes a grommet 58 made of EPDM rubber (ethylene propylene diene monomer) provided at an opening 14a, a seal plate 60 provided at the opening 14a, and a potting portion 62 made of silicone. The potting portion 62 is provided adjacent to the grommet 58 (specifically, the mating protrusion 74) through an intermediate layer 94.

A material of each of the first potting layer 62a and the second potting layer 62b preferably should be a two-component type potting material, which is hardened by chemical reaction induced when a base agent and a hardening agent are mixed together.

Figure 16:
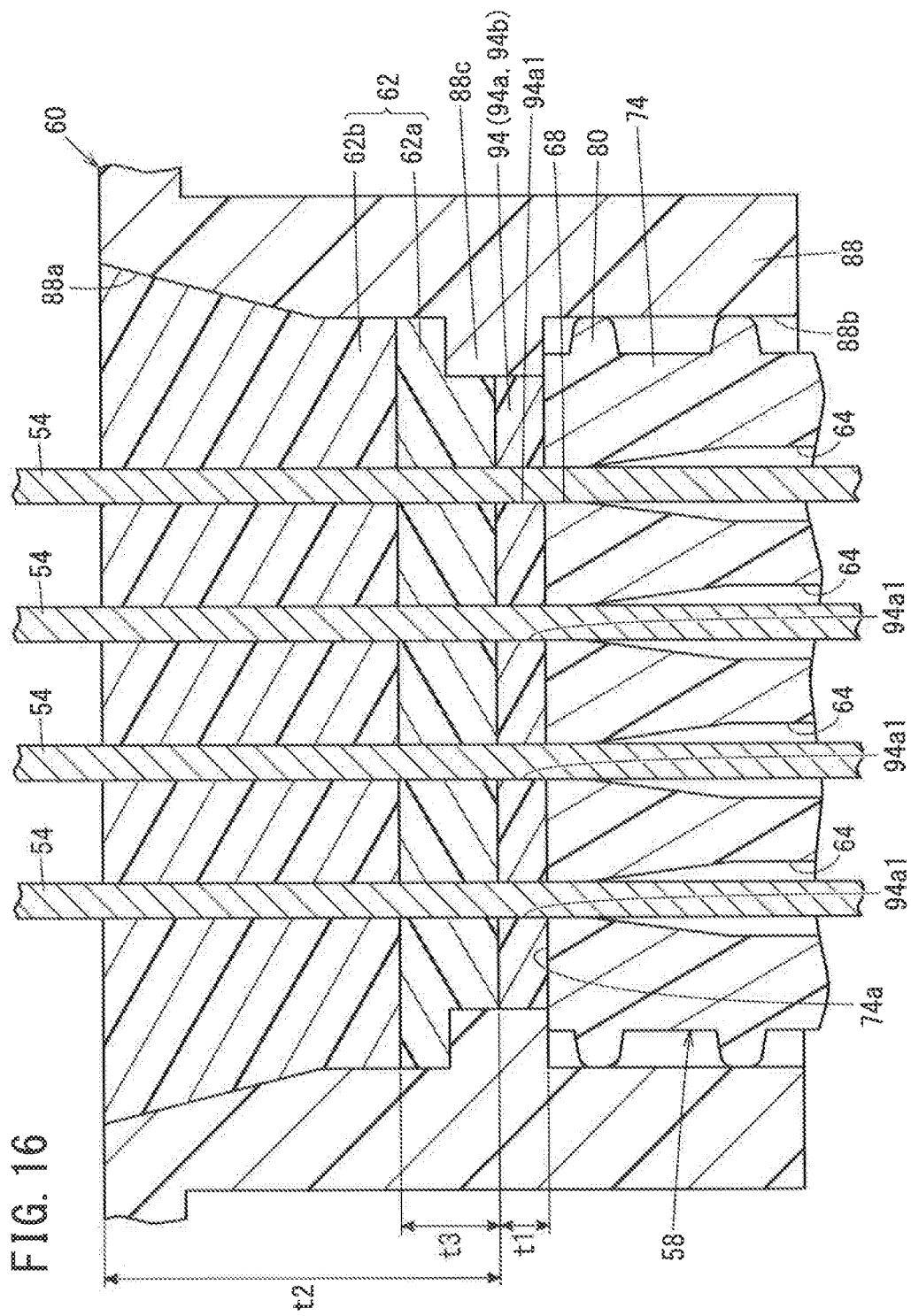
FIG. 16 is a cross sectional view showing main part of a grommet, a potting portion, and an intermediate portion.

As shown in FIG. 16, an intermediate layer 94 is provided between the grommet 58 made of EPDM and the potting portion 62 made of silicone. Specifically, the intermediate layer 94 is provided adjacent to the mating protrusion 74 (a top surface 74a) of the grommet 58. The potting portion 62 is provided adjacent to the intermediate layer 94 on the opposite side from the mating protrusion 74 of the grommet 58. Therefore, the potting portion 62 does not directly contact the grommet 58.

The intermediate layer 94 is made of a material which does not hinder hardening of the silicone potting material in the liquid state. Examples of the material which does not hinder hardening of the liquid silicone potting material includes a material which does not includes sulfur, nitrogen compound, or organic metal salt. Silicone, soft urethane, and polyvinyl chloride are specific examples of the material which does not hinder hardening of the silicone potting material.

The thickness t1 of the intermediate layer 94 is smaller than the thickness t2 of the potting portion 62. In the case where the potting portion 62 includes a first potting layer 62a and a second potting layer 62b as in the third embodiment, preferably, the thickness t1 of the intermediate layer 94 is smaller than the thickness t3 of the first potting layer 62a. Preferably, the thickness t1 of the intermediate layer 94 is in a range of 0.3 to 2.0 mm.

For example, the intermediate layer 94 is in the form of a sheet 94a having slit-shaped through holes 94a1, and flat cables 54 are inserted into the through holes 94a1. In the case of the third embodiment, as shown in FIG. 16, the sheet 94a has a plurality of through holes 94a1, and a plurality of flat cables 54 are inserted into the through holes 94a1.

Figure 17:
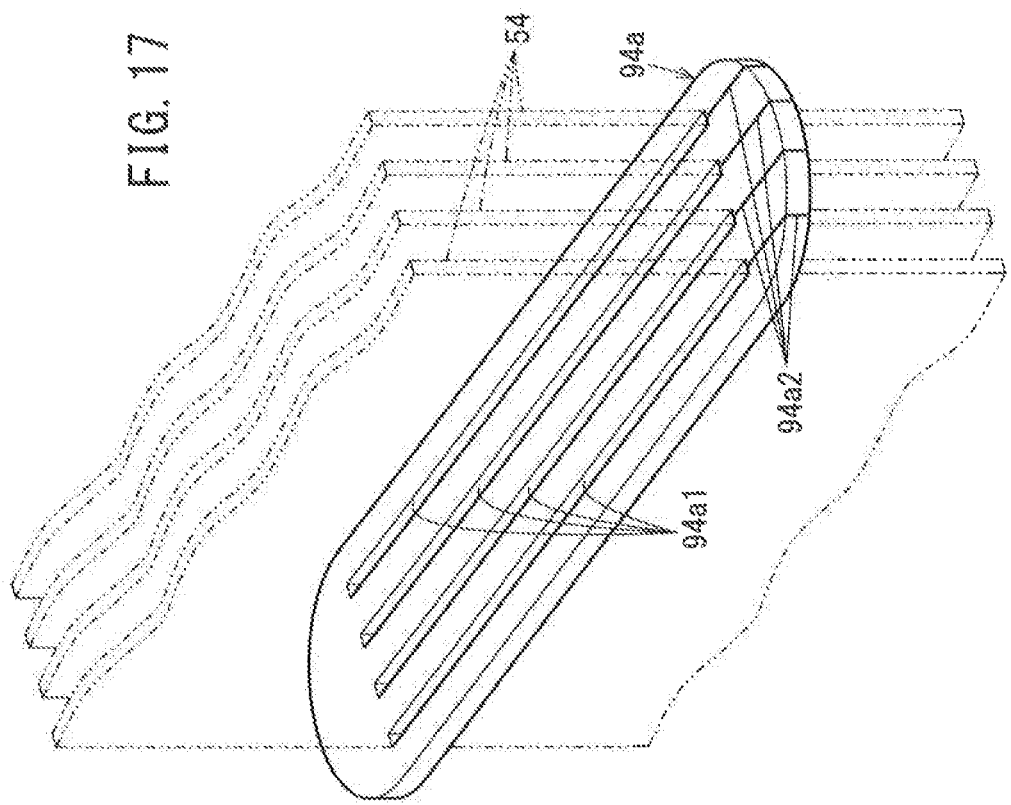
FIG. 17 is a perspective view showing a sheet of an intermediate layer.

As shown in FIG. 17, each of the through holes 94a1 extends in a longitudinal direction of the sheet 94a, and passes through the sheet 94a in the thickness direction. Each of the through holes 94a1 has substantially the same shape as the shape of the flat cable 54 in lateral cross section so as not to form a gap between the inner surface of the through hole 94a1 and the flat cable 54 substantially. It should be noted that a minute gap which does not allow entry of the liquid potting material may be formed between the flat cable 54 and the inner surface of the through hole 94a1.

Further, the sheet 94a includes a plurality of cut lines 94a2. Each of the cut lines 94a2 is connected to one end of each of the plurality of through holes 94a1. Each of the cut lines 94a2 extends in the direction in which the through hole 94a1 extends, and reaches the marginal edge of the sheet 94a.

In the step of forming the potting portion 62 shown in FIG. 15, the seal plate 60 is fixed to the opening 14a (accommodating case 14), a mating protrusion 74 of the grommet 58 is fitted into a mating recess 88b of the seal plate 60, and a plurality of flat cables 54 are inserted into the plurality of slits 64, respectively. In this state, the sheet 94a of the intermediate layer 94 is provided on the top surface 74a of the mating protrusion 74. In this case, since the plurality of cut lines 94a2 (see FIG. 17) are formed in the sheet 94a, each of the flat cables 54 can be easily inserted into each of the through holes 94a1 through each of the cut lines 94a2. In the structure, the sheet 94a can be placed on the top surface 74a of the mating protrusion 74 easily.

Next, a silicone potting material in the liquid state is poured into the accommodating recess 88a. In this case, since the sheet 94a is provided on the top surface 74a of the mating protrusion 74, the potting material in the liquid state does not contact the mating protrusion 74 (EPDM). Further, the potting portion 62 is formed by hardening the potting material.

The intermediate layer 94 may comprise a coating portion 94b made of acrylic coating, adhesive, etc., instead of the above described sheet 94a. In the step of forming the potting portion 62, the seal plate 60 is fixed to the opening 14a (accommodating case 14), the mating protrusion 74 of the grommet 58 is fitted into the mating recess 88b of the seal plate 60, and the plurality of flat cables 54 are inserted into the slits 64, respectively. In this state, a liquid coating material such as an acrylic coating, an adhesive, or the like is applied onto the top surface 74a of the mating protrusion 74. In this case, in order to prevent the top surface 74a of the mating protrusion 74 from being directly exposed at the bottom of the accommodating recess 88a (in order to cover the entire exposed top surface 74a at the bottom of the accommodating recess 88a), the coating material is applied onto an area around the flat cables 54 inserted into the slits 64 and the top surface 74a between the flat cables 54.

After the coating portion 94b is formed by hardening the liquid coating material, the silicone potting material in the liquid state is poured into the accommodating recess 88a. In this case, since the coating portion 94b is provided on the top surface 74a of the mating protrusion 74, the liquid potting material does not contact the mating protrusion 74 (EPDM). Then, the potting portion 62 is formed by hardening the potting material.

As described above, in the fuel cell stack 10b according to the third embodiment, the intermediate layer 94 which does not inhibit hardening of the silicone potting material in the liquid state is provided between the grommet 58 made of EPDM and the potting portion 62 made of silicone. Therefore, it is possible to harden the silicone potting material in the liquid state reliably. Specifically, when the silicone potting material in the liquid state contacts EPDM, the silicone potting material is not hardened easily. Therefore, in the case where the intermediate layer 94 is not provided, in the step of forming the potting portion 62, the silicone potting material in the liquid state directly contacts the grommet 58 made of EPDM, and consequently the potting material may not be hardened undesirably.

In contrast, in the third embodiment, the grommet 58 made of EPDM and the potting portion 62 made of silicone are isolated from each other by the intermediate layer 94. Therefore, at the time of forming the potting portion 62, the silicone potting material in the liquid state does not directly contact the grommet 58 made of EPDM. Thus, hardening of the liquid silicone potting material is not inhibited. Accordingly, it is possible to harden the silicone potting material in the liquid state reliably, and it is possible to form the potting portion 62 having the desired sealing performance suitably.

Further, in the third embodiment, the intermediate layer 94 is made of a material which does not include sulfur, nitrogen compound, or organic metal salt. Therefore, by the intermediate layer 94, it is possible to suitably prevent inhibition of hardening of the liquid silicone potting material.

Further, in the third embodiment, as shown in FIG. 16, the intermediate layer 94 is in the form of the sheet 94a having the through holes 94a1, and the flat cables 54 are inserted into the through holes 94a1. Therefore, with the simple and economical structure, it is possible to harden the silicone potting material in the liquid state reliably.

As described above, the intermediate layer 94 may comprise a coating portion 94b made of an acrylic coating or an adhesive. In this case, by pouring the coating material in the liquid state into the accommodating recess 88a, it is possible to form the intermediate layer 94 without any gap between the flat cables 54 and the accommodating recess 88a simply and reliably.

Figure 18:
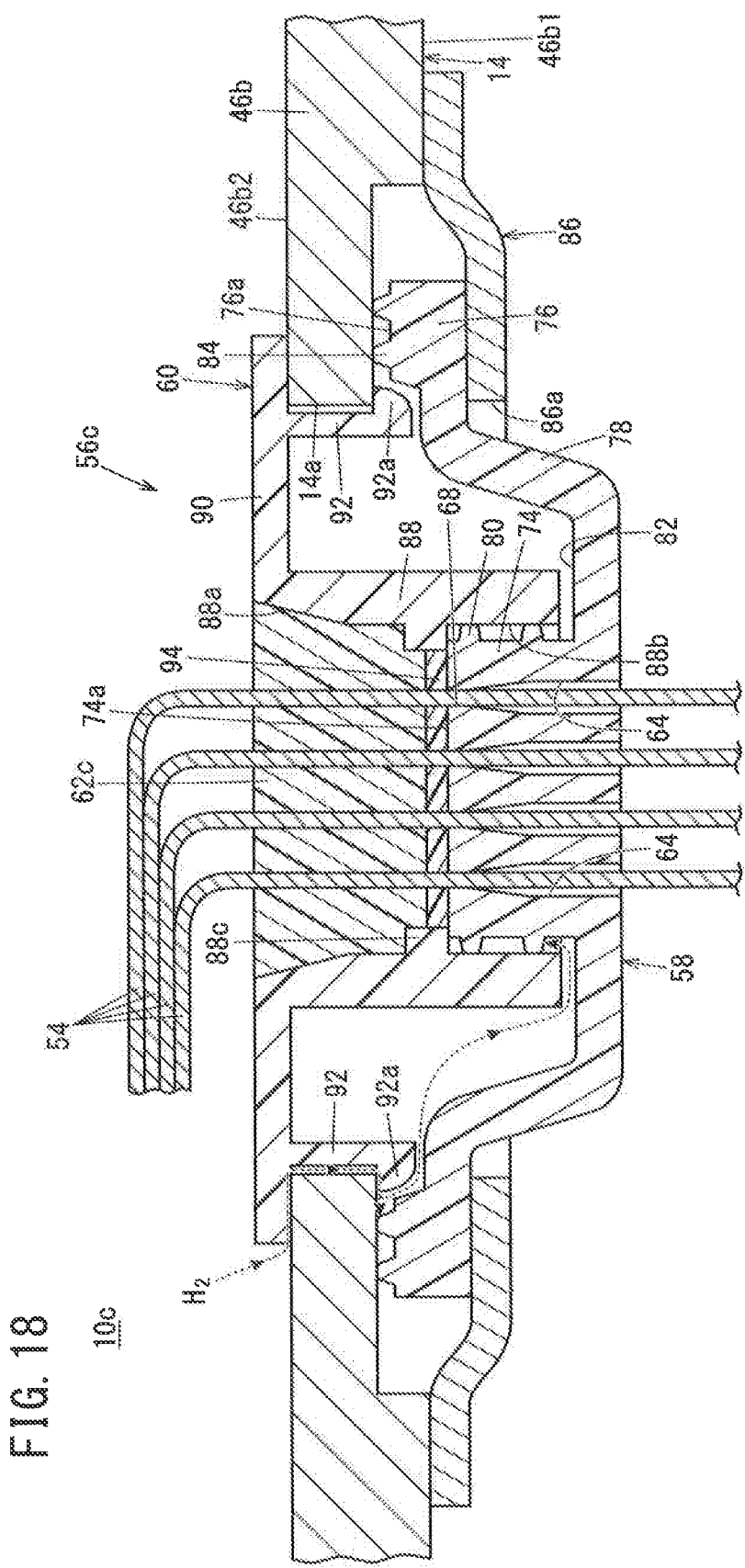
FIG. 18 is a cross sectional view showing a seal structure of a fuel cell stack according to a fourth embodiment.

In the third embodiment, the potting portion 62 has a dual layer structure including the first potting layer 62a and the second potting layer 62b, and the first potting layer 62a and the second potting layer 62b have different physical properties (hardness). As in the case of a fuel cell stack 10c according a fourth embodiment shown in FIG. 18, a potting portion 62c having a single layer structure may be provided.

That is, the seal structure 56c of the fuel cell stack 10c includes the potting portion 62c having a single layer structure without having a plurality of potting layers of different hardness.

In the first to fourth embodiments, as the cables connected to the cell voltage detection terminals 50, the flat cables 54 are used. However, instead of the flat cables 54, cables of other types may be used. The cables led out of the opening 14a of the accommodating case 14 may be cables other than the cell voltage detection cables.

The present invention is not limited to the above embodiments. Various modifications can be made without departing from the gist of the present invention.

What is claimed is:

1. A fuel cell stack comprising:
a cell stack body comprising a plurality of power generation cells stacked, the power generation cells each formed by stacking a membrane electrode assembly and a separator, the membrane electrode assembly including a pair of electrodes and an electrolyte membrane interposed between the electrodes; and
an accommodating case configured to accommodate the cell stack body,
wherein a cable connected to the cell stack body in the accommodating case passes through an opening formed in the accommodating case, and the cable is led out of the accommodating case,
wherein the cable passes through a grommet covering the opening, and the grommet is positioned with respect to the opening by a positioning member attached to the accommodating case,
wherein the grommet includes a mating protrusion protruding toward the positioning member,
wherein the positioning member includes a mating recess opened toward the grommet, and the mating protrusion is configured to be fitted into the mating recess, and
wherein the cable is inserted through the mating protrusion.

2. The fuel cell stack according to claim 1, wherein the positioning member is attached to the opening.

3. The fuel cell stack according to claim 2, wherein the opening has a non-circular shape; and
the positioning member includes an insertion portion extending along a shape of the opening and inserted into the opening.

4. The fuel cell stack according to claim 1, wherein the positioning member includes an engagement portion configured to be engaged with an inner circumferential edge of the opening, and a holder portion configured to hold the grommet inside the engagement portion.

5. The fuel cell stack according to claim 4, wherein the grommet includes a seal ridge configured to protrude toward the accommodating case and annularly arranged along an outer circumference of the grommet;
the engagement portion and the seal ridge contact a surface of the accommodating case on one side; and
the engagement portion is engaged with the inner circumferential edge inside the seal ridge.

6. The fuel cell stack according to claim 1, wherein the positioning member is attached to the opening from an opposite side from the grommet.

7. The fuel cell stack according to claim 1, wherein a bracket configured to press an outer circumferential portion of the grommet is fixed to the accommodating case.

* * * * *